(12) United States Patent
Hasebe et al.

(10) Patent No.: US 6,881,149 B2
(45) Date of Patent: Apr. 19, 2005

(54) ENTERTAINMENT SYSTEM, ENTERTAINMENT APPARATUS, RECORDING MEDIUM, AND PROGRAM

(75) Inventors: Yasuyuki Hasebe, Minato-ku (JP); Masaru Ohnuma, Minato-ku (JP); Noriaki Homan, Minato-ku (JP)

(73) Assignee: Sony Computer Entertainment Inc., Tokyo (JP)

( * ) Notice: Subject to any disclaimer, the term of this patent is extended or adjusted under 35 U.S.C. 154(b) by 33 days.

(21) Appl. No.: 10/206,607

(22) Filed: Jul. 25, 2002

(65) Prior Publication Data

US 2002/0187837 A1 Dec. 12, 2002

Related U.S. Application Data

(63) Continuation of application No. 09/654,094, filed on Aug. 3, 2000, now abandoned.

(30) Foreign Application Priority Data

Sep. 2, 1999 (JP) .......................................... 11-249348

(51) Int. Cl.⁷ ................................................. A63F 13/00
(52) U.S. Cl. ................................ 463/43; 463/1; 463/33; 463/37
(58) Field of Search ............................... 463/3, 30, 31, 463/32–33, 36–37, 43, 1, 7, 40–42; 434/19, 20, 23

(56) References Cited

U.S. PATENT DOCUMENTS

| | | |
|---|---|---|
| 4,657,247 A | 4/1987 | Okada |
| 4,738,451 A | 4/1988 | Logg |
| 5,435,554 A | 7/1995 | Lipson |

(Continued)

FOREIGN PATENT DOCUMENTS

| | | |
|---|---|---|
| EP | 0700010 A2 | 3/1996 |
| EP | 0808644 A2 | 11/1997 |
| EP | 0814433 A2 | 12/1997 |
| EP | 0919266 A2 | 6/1999 |
| EP | 0923967 A1 | 6/1999 |

(Continued)

OTHER PUBLICATIONS

European Patent Office, "European Search Report", dated May 25, 2004, for corresponding European patent application No. 00307451.5–2218, 4 pages.
Japanese Patent Office; "Rejection of the Application"; Mailing No. 408299; Mailing date Nov. 25, 2003; 4 pages (including 2–page English translation of portions).
Access Software, "Links 386 CD Players Manual", Access Software, Inc., 1995, Chapter 5, pp. 31–38.
Gaumlet (TM) Player's Manual, Atari Games, 1985, 1987, pp. 1.6.
Japanese Patent Office; Japanese Office Action dated Feb. 12, 2002; pp. 5 (with English translation of pertinent portions).

Primary Examiner—Derris H. Banks
Assistant Examiner—Alex F.R.P. Rada, II
(74) Attorney, Agent, or Firm—Fitch, Even, Tabin & Flannery

(57) ABSTRACT

When a main character enters a battle, a rectangular navigation mark is displayed over a designated monster on a display monitor. When the main character approaches the monster, the navigation mark rotates and gets smaller until it is converged into a targeting point on the display monitor. When the navigation mark is converged into a targeting point, light is emitted from the navigation mark on the display monitor. An additional attack of the main character can be performed against the monster if a user presses a decision button at the best timing, right when the light is emitted from the navigation mark.

8 Claims, 27 Drawing Sheets

U.S. PATENT DOCUMENTS

| | | | |
|---|---|---|---|
| RE35,314 E | 8/1996 | Logg | |
| 5,880,709 A | 3/1999 | Itai et al. | |
| 6,196,919 B1 * | 3/2001 | Okubo | 463/32 |
| 6,217,444 B1 | 4/2001 | Kataoka et al. | |
| 6,320,599 B1 * | 11/2001 | Sciammarella et al. | 345/667 |
| 6,371,856 B1 * | 4/2002 | Niwa | 463/43 |
| 6,556,204 B1 * | 4/2003 | Itai et al. | 345/472 |
| 6,582,308 B1 * | 6/2003 | Yamajiri et al. | 463/31 |

FOREIGN PATENT DOCUMENTS

| | | |
|---|---|---|
| JP | 58-177680 | 10/1983 |
| JP | 1-150987 | 10/1989 |
| JP | 6-254261 | 9/1994 |
| JP | 8-305356 | 11/1996 |
| JP | 10-118336 A | 5/1998 |
| JP | 11-151377 | 6/1999 |
| JP | 11-226248 A | 8/1999 |

* cited by examiner

FIG. 27

MOVEMENT SPEED INFORMATION TABLE (374)

| | |
|---|---|
| RECORD 0 | MOVEMENT SPEED |
| RECORD 1 | MOVEMENT SPEED |
| RECORD 2 | MOVEMENT SPEED |
| RECORD 3 | MOVEMENT SPEED |
| RECORD 4 | MOVEMENT SPEED |
| RECORD 5 | MOVEMENT SPEED |

_

ENTERTAINMENT SYSTEM, ENTERTAINMENT APPARATUS, RECORDING MEDIUM, AND PROGRAM

CROSS-REFERENCE TO RELATED APPLICATIONS

This patent application is a continuation of prior co-pending U.S. application Ser. No. 09/654,094, filed Aug. 31, 2000, now abandoned and claims foreign priority under 35 U.S.C. §119 to Japanese Patent Application Number 11-249348, filed Sep. 2, 1999, both of which are hereby fully incorporated herein by reference in their entirety.

BACKGROUND OF THE INVENTION

1. Field of the Invention

The present invention relates to an entertainment system which comprises an entertainment apparatus for executing various programs for generating a new event based on the movement of a navigation mark displayed on a display monitor and manipulation data inputted by a user. Further, the present invention relates to an entertainment apparatus for constituting the entertainment system, a recording medium for use of the entertainment system, and a program itself.

2. Description of the Related Art

Some entertainment systems having entertainment apparatus which include video game machines execute a game according to a game program which is read from a recording medium such as a CD-ROM or the like under the control of a manual controller while game images are being displayed on a display screen of a television receiver based on data read from the recording medium.

The entertainment apparatus and the manual controller are usually connected to each other by serial interfaces. When a clock signal is sent from the entertainment apparatus to the manual controller, the manual controller sends key switch information corresponding to manual input actions of a user in synchronism with the clock signal.

Recently, there has been developed and used a system having a manual controller which incorporates therein a vibration generating mechanism for imparting vibrations to a user in response to a request from an external drive, for example, the entertainment apparatus. While a game is in progress on the entertainment apparatus, various vibrations corresponding to manual input actions of the user are generated and imparted to the user.

In such circumstances, various types of games utilizing the above-described entertainment apparatus such as a role playing game, a shooting game, a driving game, and a fighting game are currently available on the market.

The shooting games and the fighting games are mainly directed to defeat opponents or destroy enemies by attacks. Therefore, various attacking patterns are available in most of the shooting games and the fighting games. A user can enjoy these games by selecting a suitable attacking pattern in a battle scene and executing the selected attacking pattern at the best timing for attacking opponents or enemies, while defending attacks from the opponents or the enemies.

The role playing games are mainly directed to provide a basic story through which a main character can visit a lot of places and virtually experience various events. For example, in the story, the main character explores a dungeon for defeating a boss monster or in search for a hidden treasure.

Another amusing aspect of the role playing games is to gain levels of the main character by gaining experiences through battles with monsters. The collection of gold or unique items through the battles is also an amusing aspect of the role playing games.

In most of the role playing games, when a main character gains experiences and the level of the main character goes to the next level, the main character acquires skills of weapons or magic spells. In this situation, battle scenes tend to be monotonous since animations indicating the effect of a selected weapon or a magic spell are simply displayed on a display monitor repeatedly like a simulation game.

When a magic spell is cast, the user can virtually experience the magic effect by simply viewing a realistic animation of the magic spell. However, when the user selects to attack a monster with a weapon, a rather unrealistic animation of a direct attack is displayed. That is, an animation of a main character simply running up to a monster and attacking the monster with a weapon is automatically displayed on a display monitor. Since the same animation is always displayed in every battle scene, the user soon gets tired of viewing the monotonous battle scene.

Further, when a main character performs successive attacks against a monster, since an animation of the successive attacks is simply determined by the type of a selected weapon, the battle scene tends to be monotonous also in this sense.

SUMMARY OF THE INVENTION

It is therefore an object of the present invention to provide an entertainment system, an entertainment apparatus, a recording medium, and a program which are applicable to a role playing game for making a battle scene of the role playing game more realistic, thereby preventing a user from losing interest in the role playing game.

According to the present invention, an entertainment system comprises:

an entertainment apparatus for executing various programs;

at least one manual controller for inputting a manual control request of a user to the entertainment apparatus;

a display monitor for displaying an image outputted from the entertainment apparatus; and event determining means for moving a navigation mark displayed on the display monitor in a predetermined direction as time advances, and for determining a next event to be developed based on the time difference between a point of time when the navigation mark reached a predetermined position and a point of time when the user inputted manipulation data via the manual controller.

Further, according to the present invention, an entertainment apparatus for executing various programs is connectable to at least one manual controller for inputting a manual control request of a user to the entertainment apparatus, and connectable to a display monitor for displaying an image outputted from the entertainment apparatus, wherein the entertainment apparatus comprises event determining means for moving a navigation mark displayed on the display monitor in a predetermined direction as time advances, and for determining a next event to be developed based on the time difference between a point of time when the navigation mark reached a predetermined position and a point of time when the user inputted manipulation data via the manual controller.

Further, a recording medium stores a program and data for use of an entertainment system, the entertainment system comprising:

an entertainment apparatus for executing various programs;

at least one manual controller for inputting a manual control request of a user to the entertainment apparatus; and a display monitor for displaying an image outputted from the entertainment apparatus;

wherein the program comprises the step of determining a next event to be developed based on the time difference between a point of time when a navigation mark reached a predetermined position and a point of time when the user inputted manipulation data via the manual controller.

Further, according to the present invention, a program is readable and executable by a computer, the program being for use of an entertainment system comprising:

an entertainment apparatus for executing various programs;

at least one manual controller for inputting a manual control request of a user to the entertainment apparatus; and a display monitor for displaying an image outputted from the entertainment apparatus;

wherein the program comprises the step of determining a next event to be developed based on the time difference between a point of time when a navigation mark reached a predetermined position and a point of time when the user inputted manipulation data via the manual controller.

In the above described invention, the event determining means may comprise:

navigation mark displaying means for moving the navigation mark displayed on the display monitor in the predetermined direction as time advances;

timing calculating means for calculating the time difference between the point of time when the navigation mark reached the predetermined position and the point of time when the user inputted the manipulation data via the manual controller; and comparing means for comparing the calculated time difference with a predetermined time.

The event determining means may generate a new event when the comparing means generates a comparison result indicating that the calculated time difference is within the predetermined time.

The event determining means may generate a new event a plurality of times corresponding to the number of times the comparing means successively generates a comparison result indicating that the calculated time difference is within the predetermined time.

In the above described invention, the step of determining a next event may comprise the steps of:

moving the navigation mark displayed on the display monitor in a predetermined direction as time advances;

calculating the time difference between the point of time when the navigation mark reached the predetermined position and the point of time when the user inputted the manipulation data via the manual controller; and comparing the calculated time difference with a predetermined time.

The step of determining a next event may comprise the step of generating a new event when a comparison result indicating the calculated time difference is within the predetermined difference is obtained in the comparing step.

The step of determining a next event may comprise the step of generating a new event a plurality of times corresponding to the number of times a comparison result indicating that the calculated time difference is within the predetermined time is obtained successively in the comparing step.

For example, in a battle scene of a role playing game, when a user tries to attack a monster with a weapon, after a command for attacking the monster with the weapon is selected by the user, an animation of the main character for preparing an attack against the monster with the weapon is displayed on a display monitor. Then, after manipulation data is inputted by the user, an animation of actually attacking the monster with the weapon is displayed based on the manipulation data.

However, it is not possible to create a sufficiently realistic battle scene merely by the above change of the screen image.

Therefore, according to the present invention, the next event is determined based on the time difference between a point of time when a navigation mark reached a predetermined position and a point of time when a user inputted manipulation data via a manual controller.

Accordingly, it is possible to determine the type of the main character's attack based on the time difference. Specifically, if the time difference is very small, an attack of a higher level (successive attacks) is displayed. If the time difference is large, an attack of a lower level (single attack) or a miss attack is displayed.

Further, it is possible to display additional attacks based on the number of successive comparison results obtained when the time difference is within a predetermined range.

Basically, a battle scene of a role playing game tends to be monotonous. However, according to the present invention, it is possible to make the battle scene of the role playing game highly realistic. Therefore, it is possible to prevent the user from losing interest in the battle scene of the role playing game.

According to the present invention, the predetermined direction for moving the navigation mark may be a converging direction of the navigation mark to be converged into a targeting point of a designated object. In this case, the navigation mark may comprise a polygonal frame rotating and getting smaller to be converged into the targeting point on the display monitor. Further, the point of time when the navigation mark reached the predetermined position is a point of time when the navigation mark was converged into the targeting point.

That is, the navigation mark indicating a targeting area rotates and gradually gets smaller. The navigation mark reaches the predetermined position when the navigation mark becomes as large as a predetermined size. The above described processes can be achieved based on the time difference between the point of time when the navigation mark reached the predetermined position and the point of time when the user inputted manipulation data.

According to the present invention, the predetermined direction for moving the navigation mark may be a circulating direction of the navigation mark circulating along a predetermined graphic object. In this case, the point of time when the navigation mark reached the predetermined position may be a point of time when the navigation mark reached an arbitrary point in a circulating line of the navigation mark.

Further, a light may be emitted from the navigation mark when the navigation mark reaches the predetermined position. In this case, in the battle scene where the navigation mark is rotating and getting smaller, it is made easier for the user to recognize the right timing of the navigation mark to reach the predetermined position. Therefore, the user can successively perform an attack of a higher level multiple times. Accordingly, a further amusing aspect can be added to the battle scene.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 27 is a view showing contents of a movement speed information table.

DESCRIPTION OF THE PREFERRED EMBODIMENT

An embodiment of the entertainment system according to the present invention which is applied to a video game apparatus, and an embodiment of the recording medium according to the present invention which is applied to a recording medium for storing a program and data executable by the video game apparatus will be described with reference to FIGS. 1 through 27.

Figure 1:
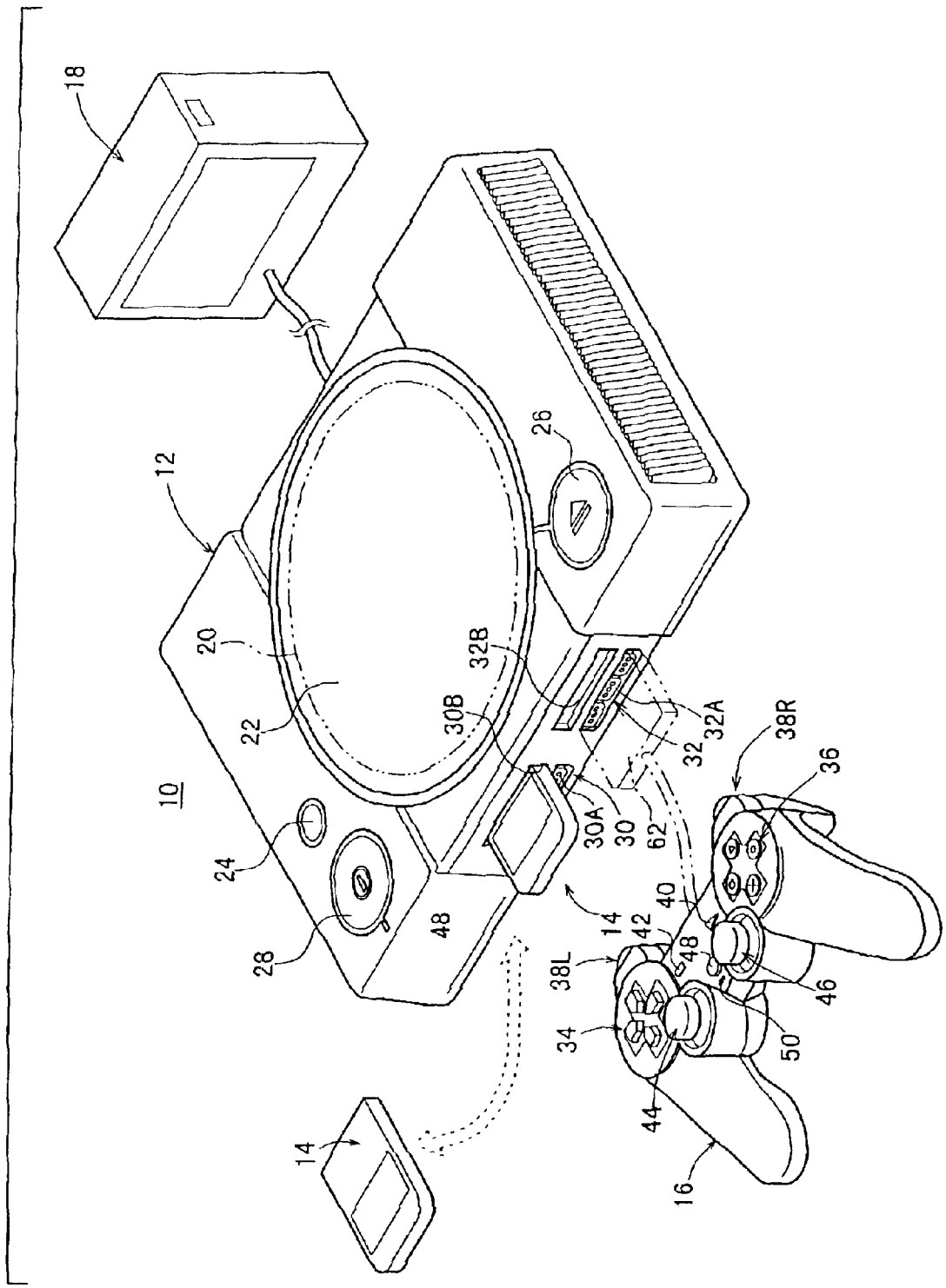
FIG. 1 is a perspective view of an entertainment system according to an embodiment of the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from a user, e.g., a game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 may be connected respectively to the lower slots units 30A, 32A, and memory cards 14 (or unillustrated portable information terminals having the function of the memory card 14) for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

Figure 2:
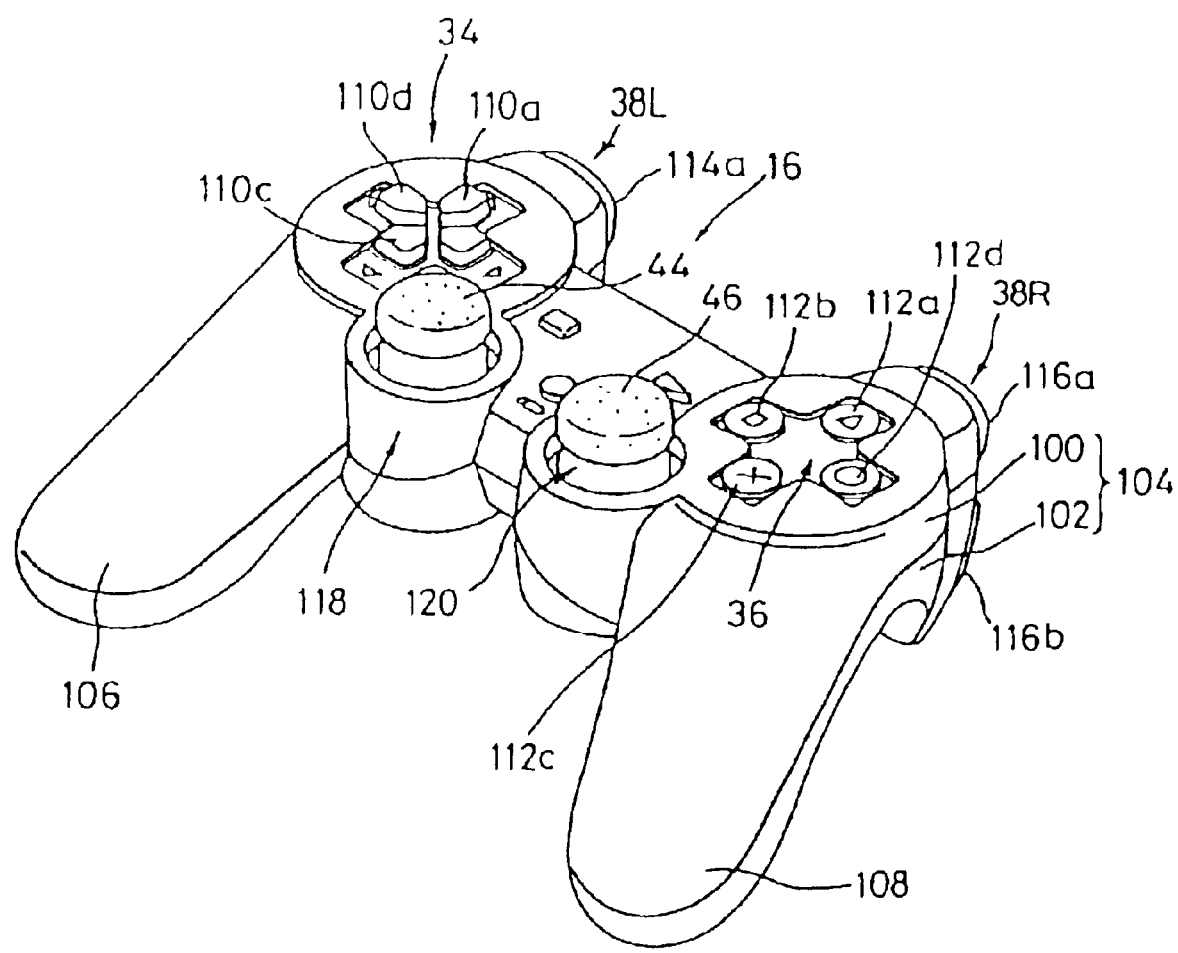
FIG. 2 is a perspective view of a manual controller.
Figure 3:
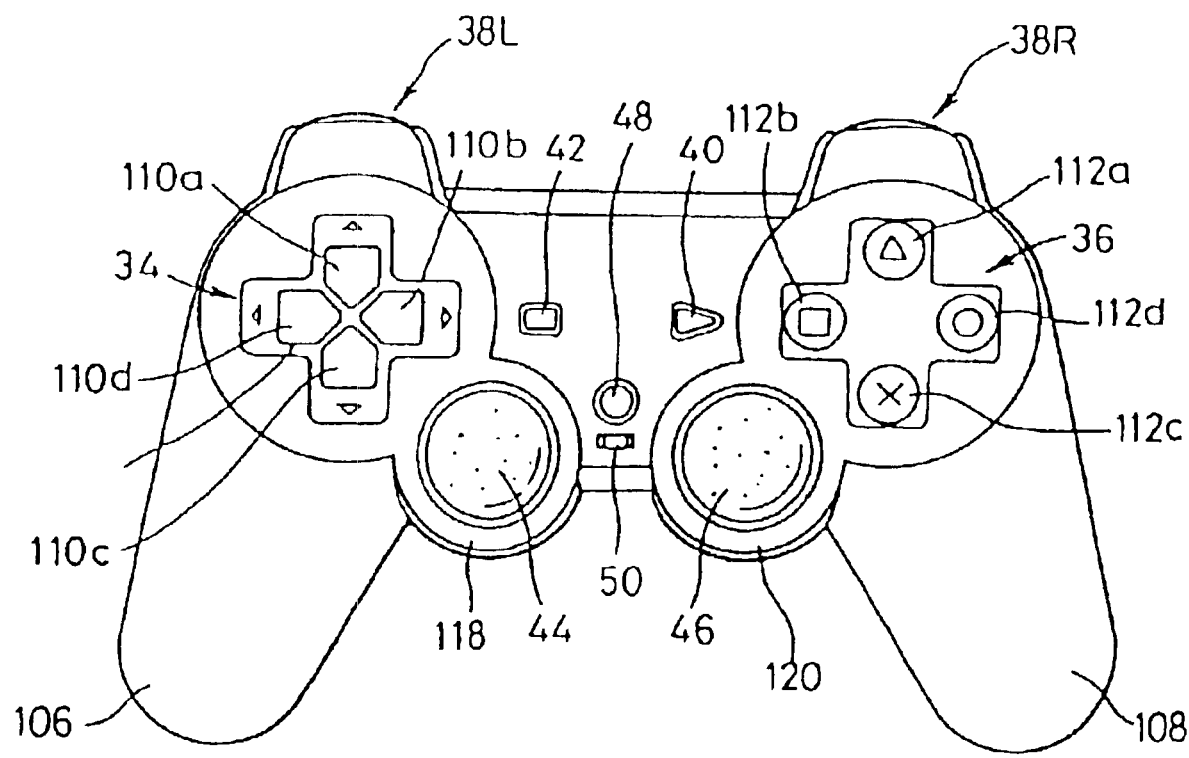
FIG. 3 is a plan view of the manual controller.

As shown in FIGS. 2 and 3, the manual controller 16 has first and second control pads 34, 36, an L (Left) button 38L, an R (Right) button 38R, a start button 40, and a selection button 42. The manual controller 16 also has joysticks 44, 46 for inputting analog control actions, a mode selection switch 48 for selecting control modes of the joysticks 44, 46, and an indicator 50 for indicating a selected control mode. The indicator 50 comprises a light-emitting element such as a light-emitting diode or the like.

As shown in FIG. 2, the manual controller 16 has a housing 104 comprising an upper member 100 and a lower member 102 which are mated and joined to each other by fasteners such as screws.

As shown in FIGS. 2 and 3, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the left and right grips 106, 108 are progressively spaced away from each other toward their distal ends. To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises a first pressable control member (up button) 110a, a second pressable control member (right button) 110b, a third pressable control member (down button) 110c, and a fourth pressable control member (right button) 110d. The first through fourth pressable control members 110a, 110b, 110c, 110d, project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the housing 104 and comprises a first pressable control member (Δ button) 112a, a second pressable control member (□ button) 112b, a third pressable control member (x button) 112c, and a fourth pressable control member (○ button) 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
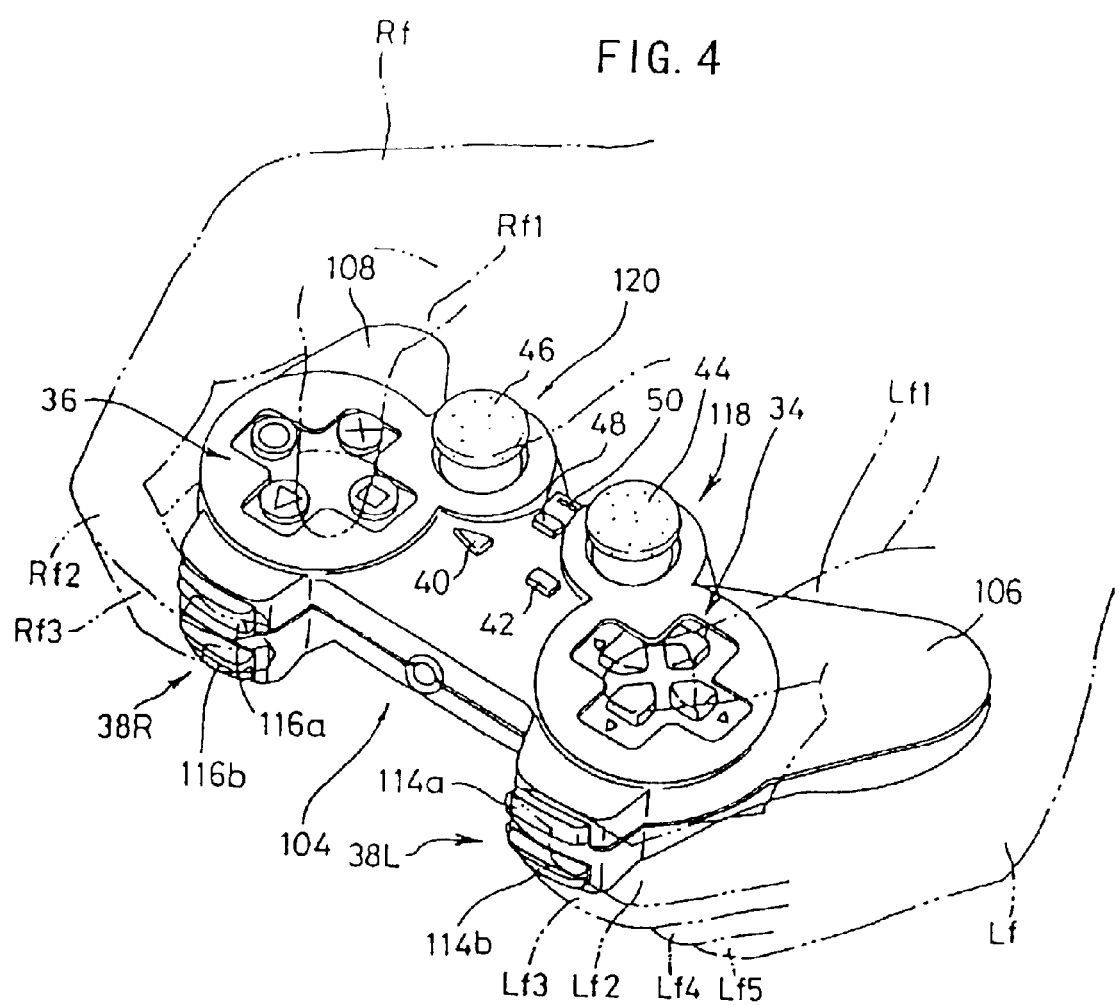
FIG. 4 is a perspective view showing a manner in which the manual controller is used.

The L button 38L and the R button 38R are disposed on a side of the housing 104 remote from the left and right grips 106, 108 and positioned respectively at the opposite ends of the housing 104. As shown in FIGS. 2 and 4, the L button 38L has a first left pressable control member (L1 button) 114a and a second left pressable control member (L2 button) 114b, and the R button 38R has a first right pressable control member (R1 button) 116a and second right pressable control member (R2 button) 116b, respectively. The L button 38L and the R button 38R have respective switch elements associated respectively with the pressable control members (the L1 button 114a, the L2 button 114b, the R1 button 116a, and the R2 button 116b).

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the housing 104 and the proximal ends of the left and right grips 106, 108 which are joined to the housing 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the control shaft of the left and right joysticks 44, 46 are normally urged to return to their neutral positions by biasing members. The left and the right joysticks 44, 46 can be freely tilted in all directions (360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, it can also select a control mode for allowing a command signal to be inputted from the first and second analog control pads 118, 120 and selecting the function of the first through fourth pressable control members 112a, 112b, 112c, 112d of the second control pad 36 or the function of the pressable control members 114a, 114b and 116a, 116b of the L button 38L and the R button 38R. Depending on the control mode selected by the mode selection switch 48, the mode indicator 50 flickers and changes its indication light.

As shown in FIG. 4, the left and right grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 4, when the first and second grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the housing 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 4, when the left and right grips 106, 108 are gripped respectively by the palms of the hands of the game player, the index fingers Lf2, Rf2 and middle fingers Lf3, Rf3 of the left and right hands can extend over positions where they can selectively press the L1 button 114a, L2 button 114b of the L button 38L and R1 button 116a, R2 button 116b of the R button 38R.

Figure 5:
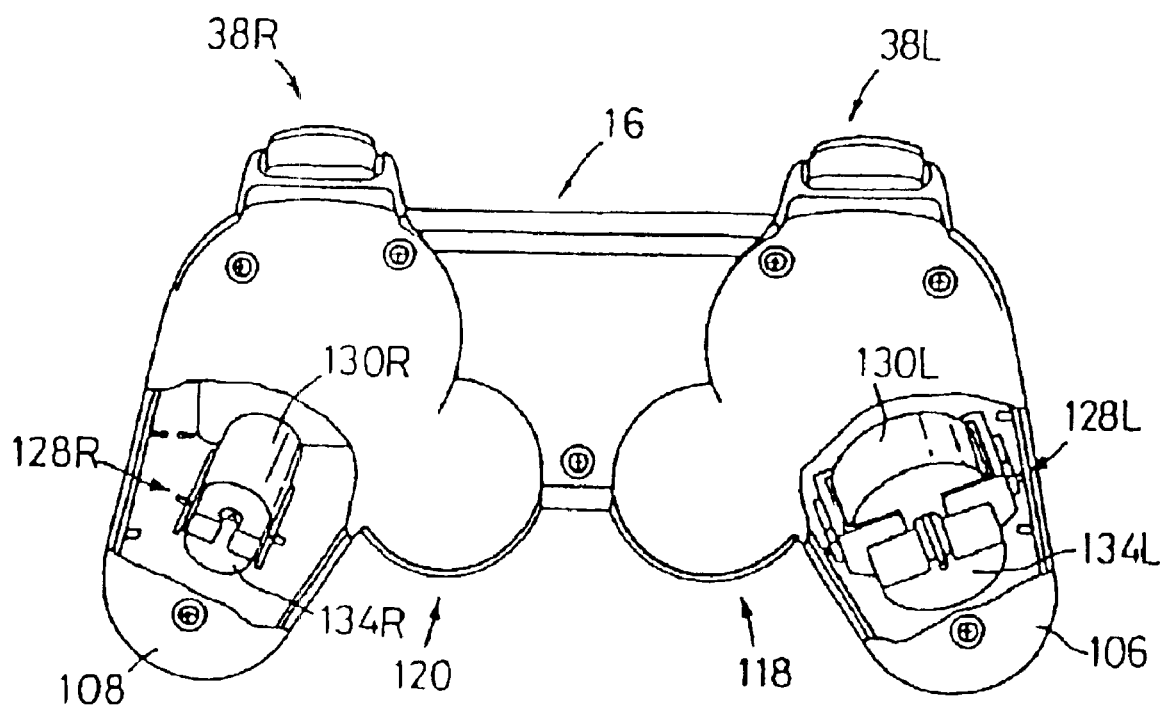
FIG. 5 is a bottom view, partly broken away, of the manual controller, showing vibration imparting mechanisms disposed respectively in left and right grips.

As shown in FIG. 5, the manual controller 16 has a pair of vibration imparting mechanisms 128L, 128R for imparting vibrations to the user in order for the user to be able to play a highly realistic game.

As shown in FIG. 5, the left and right vibration imparting mechanisms 128L, 128R are positioned near the proximal ends of the left and right grips 106, 108 that are held by the hands and fingers when the manual controller 16 is gripped by the user.

Since the both vibration imparting mechanisms 128L, 128R have basically the same structure except their vibration characteristics, only the right vibration imparting mechanism 128R will be described for the purpose of brevity.

The vibration imparting mechanisms 128R comprises a motor 130R energizable by a vibration generating command supplied from the entertainment apparatus 12, and an eccentric member 134R mounted eccentrically on the drive shaft of the motor 130R.

The eccentric member 134R comprises a weight in the form of a heavy metal member having a semicircular cross-sectional shape. The weight has an off-center hole defined therein in which the drive shaft of the motor 130R is fitted.

According to the vibration imparting mechanisms 128L, 128R as constructed above, when the motors 130L, 130R are energized, the drive shafts thereof rotate to cause the eccentric members 134L, 134R to rotate in an eccentric motion for thereby generating vibrations, which are imparted to the left grip 106 and the right grip 108. Then, the vibrations of the left grip 106 and the right grip 108 are applied to the hands and fingers of the user.

Next, the vibration characteristics of the vibration imparting mechanisms 128L, 128R disposed in the left grip 106 and the right grip 108 respectively will be described hereinbelow.

The vibration imparting mechanisms 128L, 128R have the different vibration characteristics.

For example, the motor 130L of the left vibration imparting mechanism 128L is bigger than the motor 130R of the right vibration mechanism 128R. The rotational speed of the motor 130L varies according to a vibration value included in a vibration generating command transmitted from the entertainment apparatus 12. That is, vibrations having different frequencies can be generated depending on the vibration value. In the present embodiment, the vibration frequency of the motor 130L varies in proportion to the vibration value.

In contrast to the motor 130L of the left vibration mechanism 128L, the vibration frequency of the motor 130R of the right vibration mechanism 128R does not vary according to the vibration value included in the vibration generating command. The motor 130R of the right vibration mechanism 128R is simply energized or deenergized according to the vibration value. If the vibration value (logic value) is "1", the motor 130R of the right vibration mechanism 128R is energized. If the vibration value is "0", the motor 130R of the right vibration mechanism 128R is deenergized. When the motor 130R of the right vibration mechanism 128R is energized, it rotates at a constant speed to generate vibrations at a constant frequency.

In order to energize the motors 130L, 130R to vibrate the manual controller 16 in its entirety, a bidirectional communication function needs to be provided between the manual controller 16 and the entertainment apparatus 12. This bidirectional communication function will be described later on.

Next, circuit arrangements of the entertainment apparatus 12 and the manual controller 16 will be described below with reference to FIGS. 6 through 8.

Figure 6:
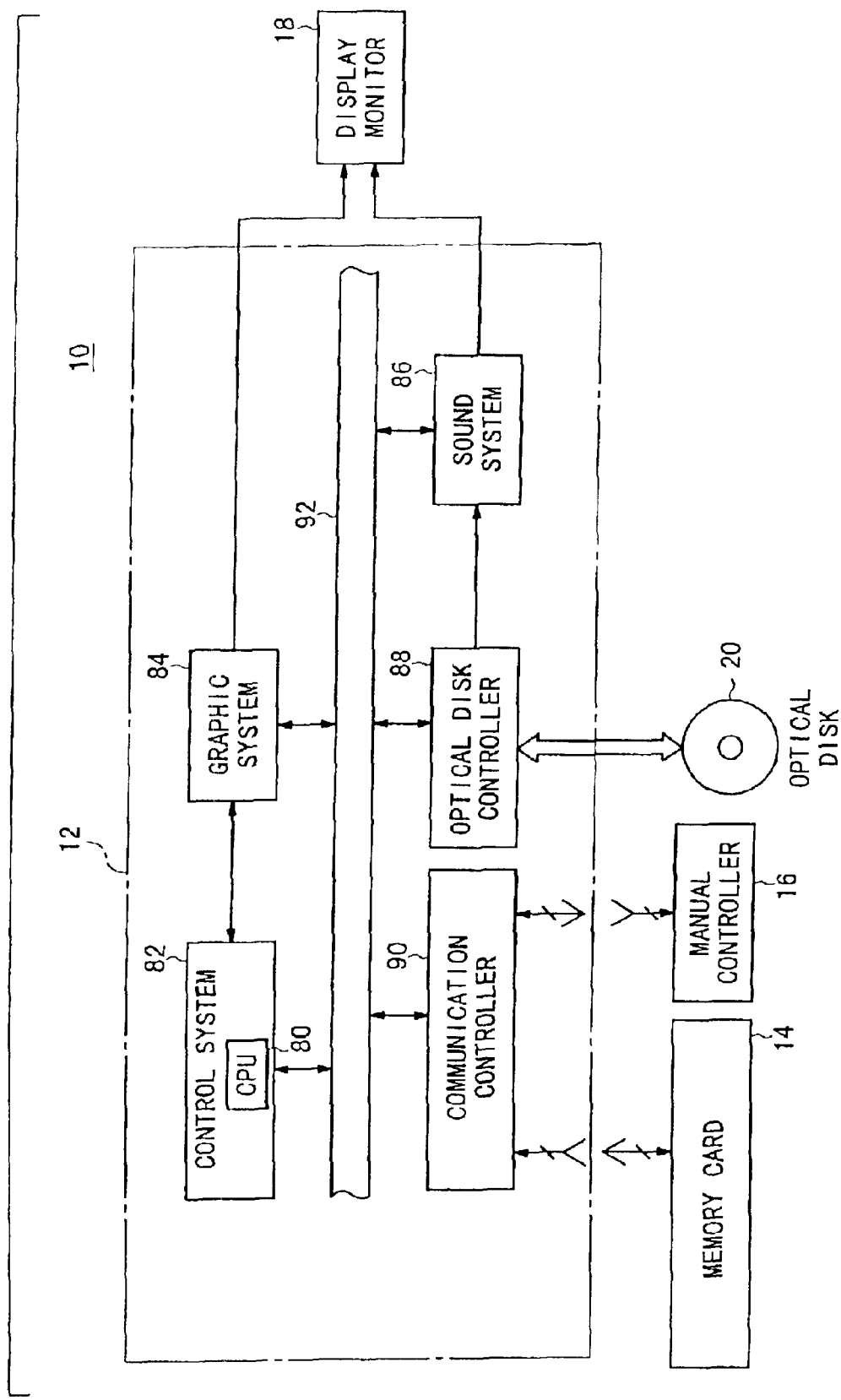
FIG. 6 is a block diagram showing a circuit arrangement of the entertainment apparatus.

As shown in FIG. 6, the entertainment apparatus 12 comprises a control system 82 including a central processing unit (CPU) 80 and peripheral devices thereof, a graphic system 84 including a frame buffer (not illustrated) and a graphic processing unit (GPU) for rendering image data in the frame buffer, a sound system 86 including a sound processing unit (SPU) for generating music sounds and sound effects, an optical disk controller 88 for controlling the readout of the optical disk 20 in which application programs and data are stored, a communication controller 90 for controlling the inputting of data into and outputting of data from the manual controller 16 and the memory card 14, and a system bus 92 to which the control system 82, the graphic system 84, the sound system 86, the optical disk controller 88, and the communication controller 90 are connected.

Video and audio signals generated by and outputted from the graphic system 84 and the sound system 86 are supplied to the display monitor 18 to display images on the monitor screen of the display monitor 18 and reproduce sounds from the speakers of the display monitor 18.

Figure 7:
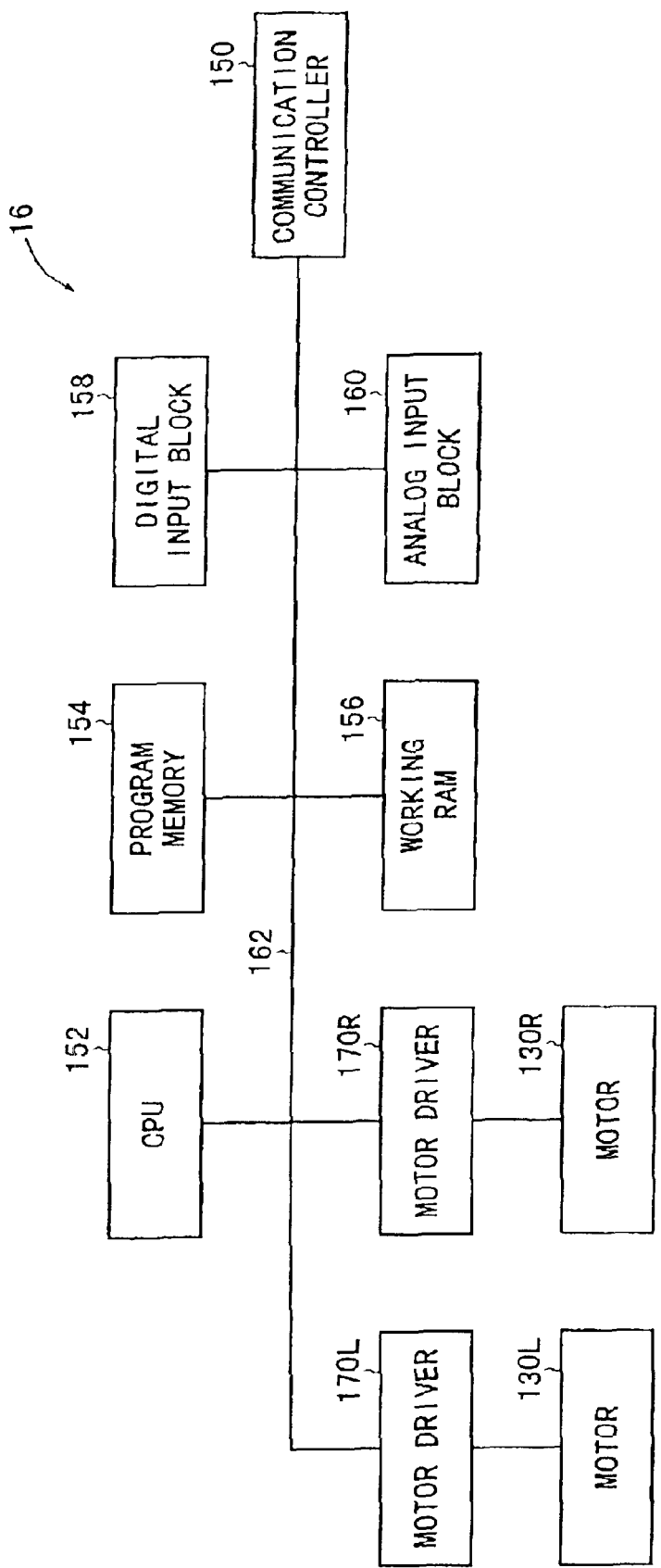
FIG. 7 is a view showing a system of the manual controller.

As shown in FIG. 7, the manual controller 16 comprises a communication controller 150, a CPU 152, a program memory 154, a working RAM 156, a digital input block 158, an analog input block 160, the left motor driver 170L, the left motor 130L, the right motor driver 170R, and the right motor 130R. These components of the manual controller 16 are connected to a bus 162.

The digital input block 158 functions as a manual input controller for the first through fourth pressable control members 110a–110d of the first control pad 34 and the first through fourth pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 90 of the entertainment apparatus 12 (see FIG. 6), for example, for data communication with the entertainment apparatus 12.

Figure 8:
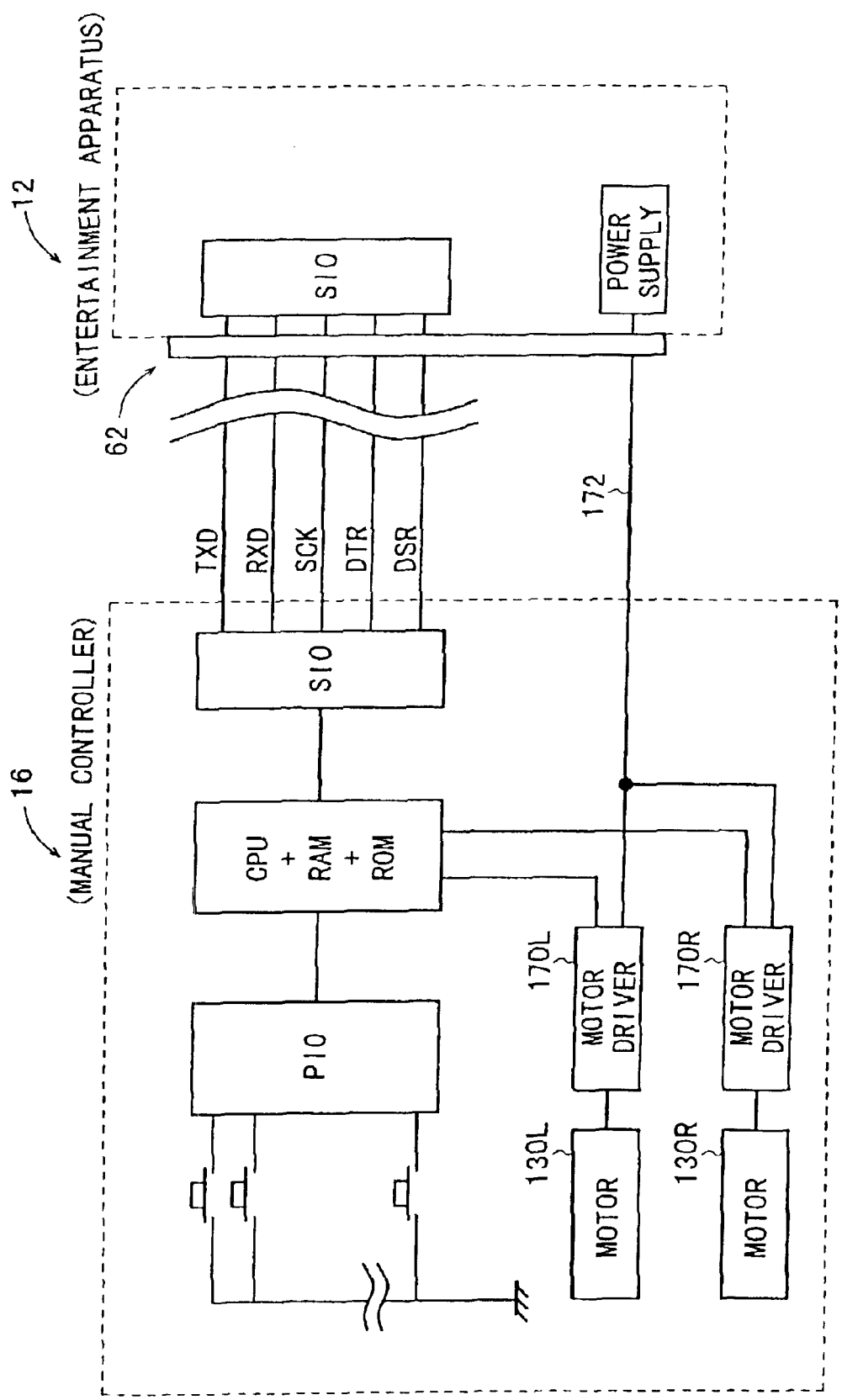
FIG. 8 is a block diagram of main components for carrying out bidirectional serial communications between the manual controller and the entertainment apparatus.

As shown in FIG. 8, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering manipulation data from a plurality of control buttons, a one-chip microcomputer comprising a CPU, a RAM, and a ROM, and motor drivers 170R, 170L for energizing the motors 130R, 130L of the vibration imparting mechanisms 128R, 128L. The motors 130R, 130L are energized for rotation by voltages and currents supplied from the corresponding motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the manual controller 16 and the entertainment apparatus 12. Other structural details of the entertainment apparatus 12 are omitted from illustration in FIG. 8.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. As shown in FIG. 8, this cable further includes a power line 172 extending from a power supply in the entertainment apparatus 12 and connected to the motor drivers 170R, 170L in the manual controller 16 for supplying electric energy to energize the motors 130R, 130L.

A process of bidirectional serial communication between the manual controller 16 and the entertainment apparatus 12 will be described below. In order for the entertainment apparatus 12 to communicate with the manual controller 16 to read manipulation data from the digital input block 158 and the analog input block 160, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends manipulation data via the data transfer signal line TXD to the manual controller 16, which sends the manipulation data from the digital input block 158 and the analog input block 160 to the entertainment apparatus 12 via the data transfer signal line RXD. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly manipulation data from the digital input block 158 and the analog input block 160 to the entertainment apparatus 12, and the entertainment apparatus 12 can send a vibration generating command for energizing the motors 130R, 130L of the vibration imparting mechanisms 128R, 128L via the data transfer signal line TXD to the manual controller 16.

The vibration generating command for energizing the motors 130R, 130L has been established in advance in the optical disk 20 set in the entertainment apparatus 12. Alternatively, the vibration generating command is generated by the entertainment apparatus 12.

Next, a characteristic function of the entertainment system 10 according to the present embodiment will be described below with reference to FIGS. 9 through 27.

The characteristic function of the entertainment system 10 is to move a navigation mark displayed on the display monitor 18 in a predetermined direction as time advances, and to determine the next event to be developed based on the time difference between a point of time when the navigation mark reached a predetermined position and a point of time when a user inputted manipulation data via the manual controller 16.

The characteristic function of the entertainment system 10 will be readily understood from the following description about battle systems in a role playing game to which the entertainment system 10 according to the present embodiment is applied.

According to a first battle system utilizing the characteristic function of the entertainment system 10, the navigation mark such as a moving (for example, rotating) polygonal frame on the display monitor 18 gradually gets smaller until it is converged into a targeting point (or until it overlaps another smaller polygonal frame). The next event to be developed is determined based on the time difference between a point of time when the navigation mark was converged into the targeting point and a point of time when the user inputted manipulation data via the manual controller 16.

The first battle system will be described specifically with reference to FIGS. 9 through 14 schematically showing a battle scene of a role playing game.

Figure 9:
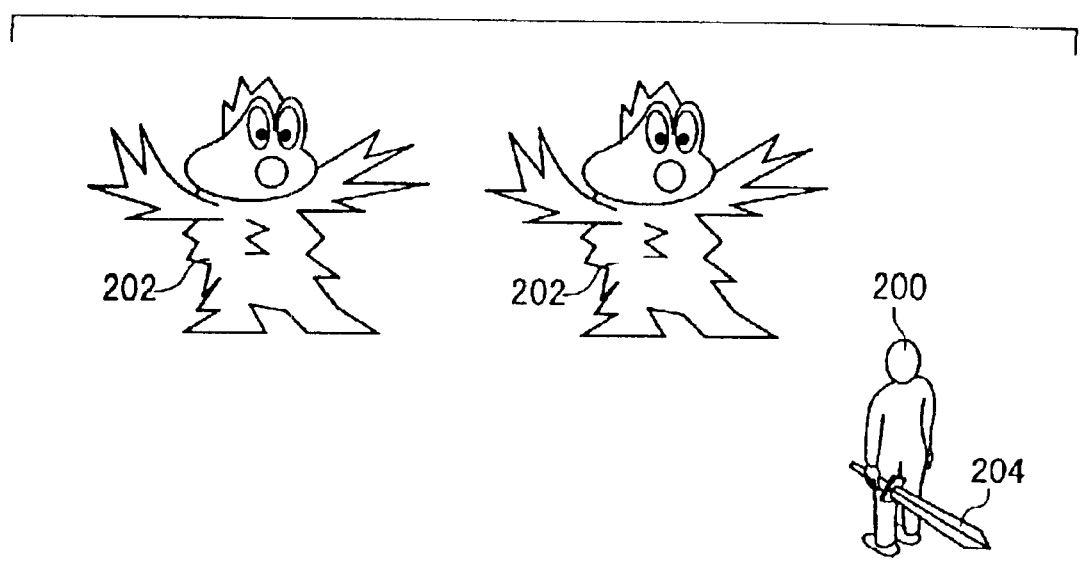
FIG. 9 is a view showing a condition in which a main character and monsters are standing face-to-face.

In FIG. 9, when the user enters a battle, a main character 200 and monsters (enemies) 202 are displayed on the display monitor 18.

At this time, the user is requested to input a manipulation command for determining an action in the battle. It is to be understood that there are many types of actions such as "attack a monster with a weapon", "cast a magic spell", "defend (parry) the monster's attack" and "use an item" depending on the nature of the game. If the user inputs a manipulation command for attacking a monster with a weapon, the user is requested to select one monster to be targeted for attack from the monsters in the battle scene.

Figure 10:
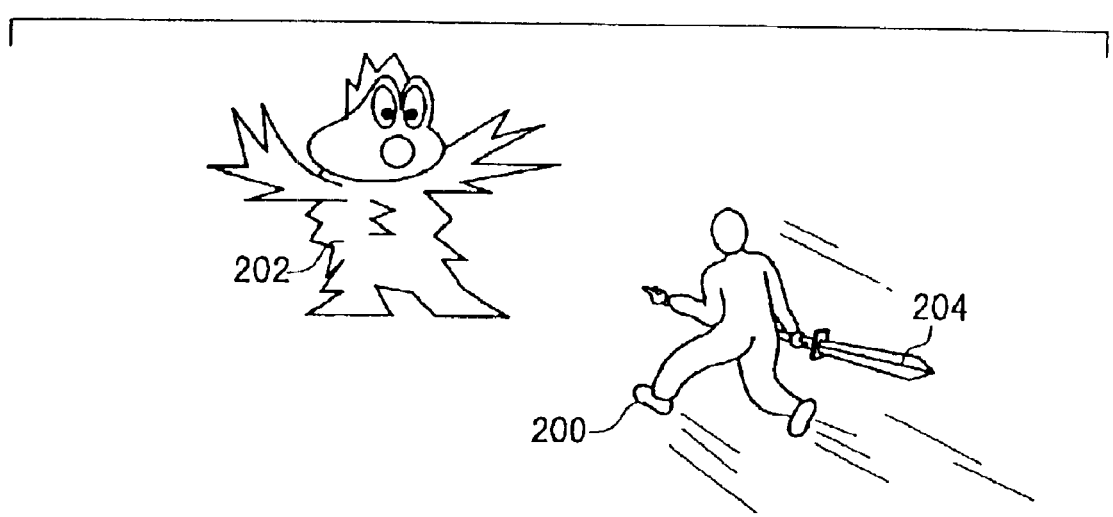
FIG. 10 is a view showing a condition in which the main character starts running toward the monster.
Figure 11:
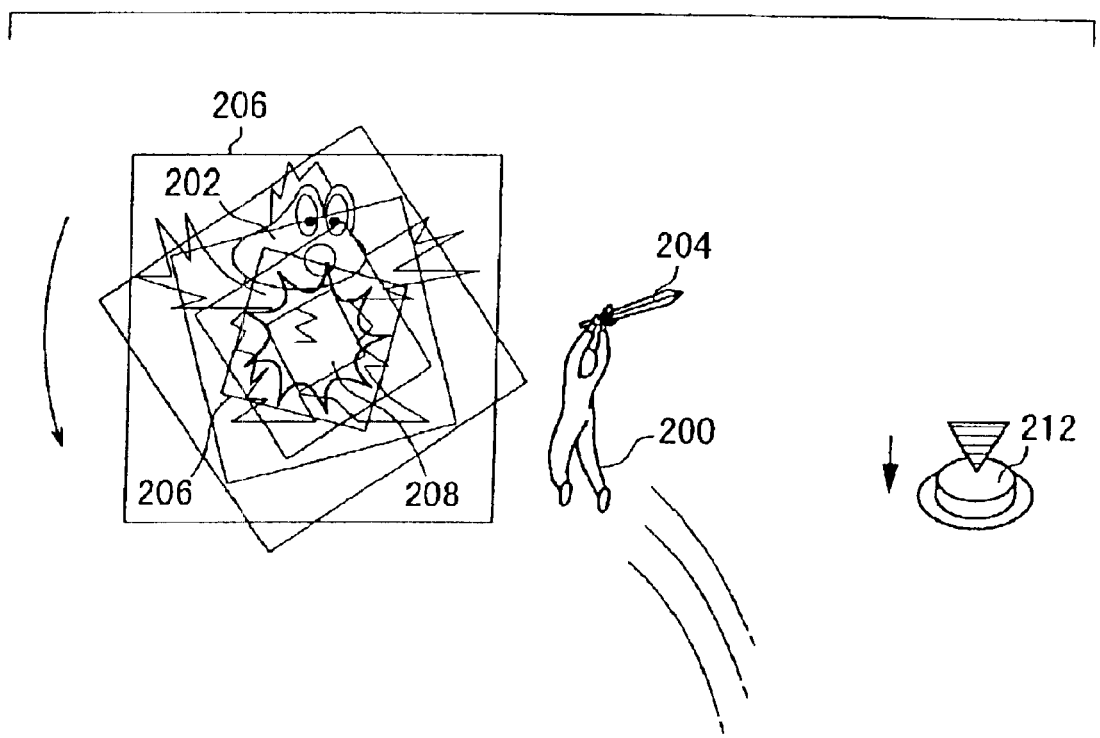
FIG. 11 is a view showing a condition in which a navigation mark is rotating and getting smaller when the main character jumps up for attacking the monster.

As shown in FIG. 10, when the user inputs manipulation commands for attacking one of the monsters 202 with a weapon 204, the main character 200 starts running toward the selected monster 202. After arriving at a position for attacking, as shown in FIG. 11, the main character 200 jumps up for attacking the monster 202. At this time, an outer moving square (navigation mark) 206 and an inner stationary square (targeting point) 208 are displayed over the monster 202. The outer square 206 rotates and gradually gets smaller until it becomes substantially as large as the inner square 208 and overlaps the inner square 208. When the outer square (navigation mark) 206 becomes substantially as large as the inner square 208 and overlaps the inner square 208, light is emitted from the navigation mark 206.

Figure 12:
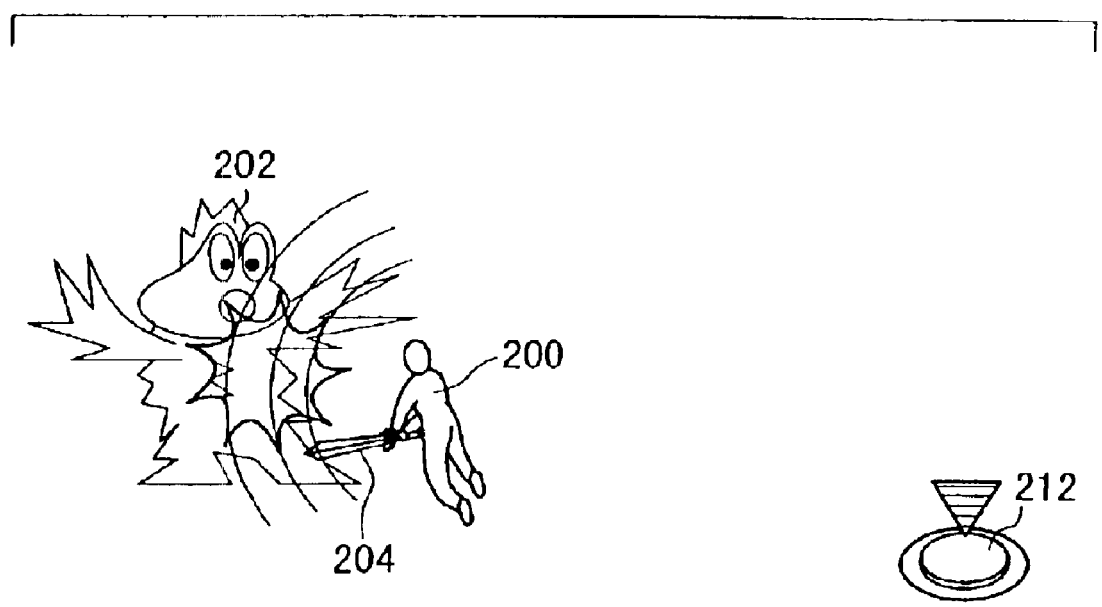
FIG. 12 is a view showing a condition in which the main character is attacking the monster with a weapon.

As shown in FIG. 12, the user can simply perform a single attack by pushing the ○ button (decision button) 112d of the manual controller 16. However, if the user pushes the decision button 112d simultaneously with the light-emission from the navigation mark 206, it is possible to perform another attack. That is, if the user successfully pushes the decision button 112d at the best timing, right when the outer moving square 206 overlaps the inner stationary square 208, the user gets an additional attack (second attack).

If the second attack is also performed at the best timing, the user may get a third attack. In this way, the user can successively attack the monster 202 multiple times by manipulating the controller 16 at the best timing. It is possible to set the maximum number of attacks based on the level of the character 200 or the type of the weapon 204.

If the user misses to push the decision button 112d at the best timing, that is, if the user fails to push the decision button 112d right when the outer moving square 206 overlaps the inner stationary square 208, the user can not perform the additional attack any more.

Figure 13:
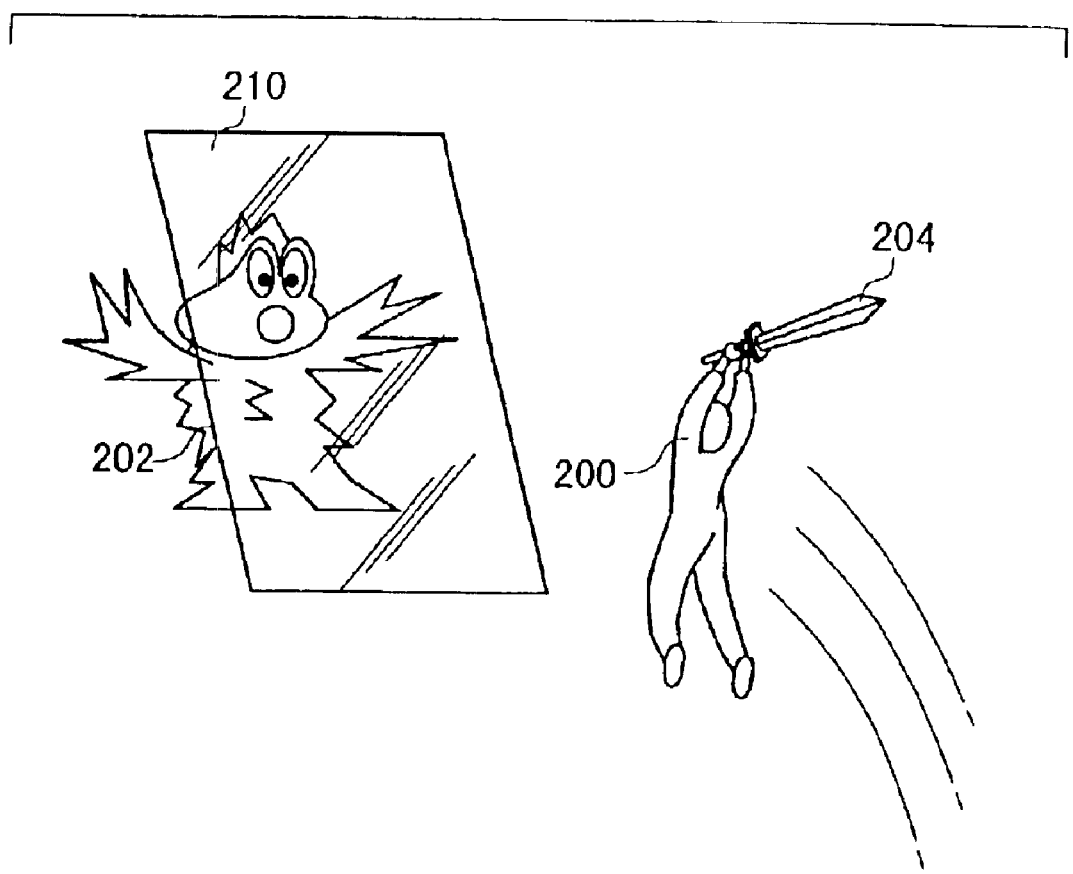
FIG. 13 is a view showing a condition in which the monster is trying to counterattack the main character.
Figure 14:
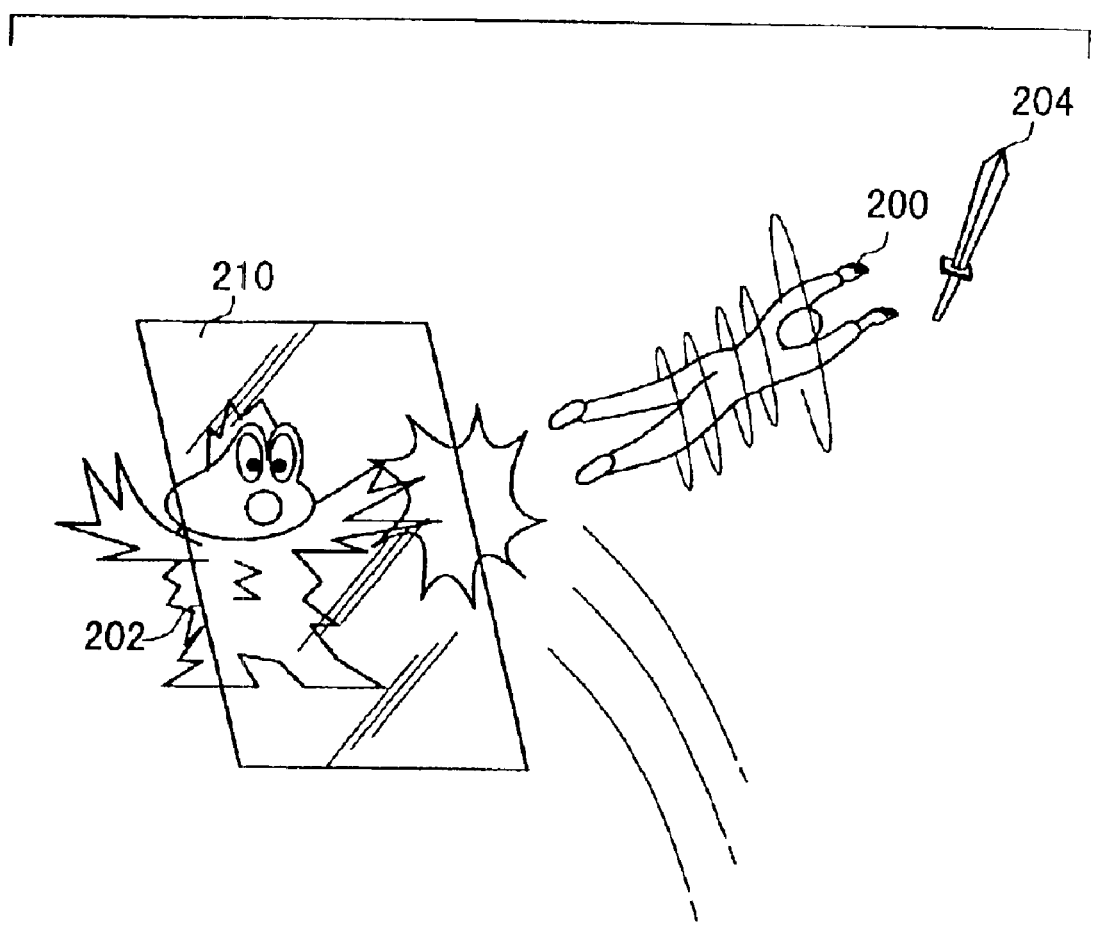
FIG. 14 is a view showing a condition in which the main character is being flicked away by the counterattack of the monster.

When the main character 200 attacks the monster 202, the monster 202 does not always sit there and take successive (multiple) attacks like an idiot. The monster 202 may counterattack the main character 200. For example, as shown in FIG. 13, the monster 202 uses a counterattack barrier 210 when the main character 200 tries to attack the monster 202. In this case, the user may push the x button 112c of the manual controller 16 for defending (dodging) the counterattack. If the user fails to defend the counterattack, as shown in FIG. 14, the main character will be flicked away by the counterattack barrier 210.

As shown in FIGS. 11 and 12, a button icon 212 indicating the timing for pressing the decision button 112d may be displayed on the right side of the display monitor 18. The button icon 212 moves up and down synchronously with the manipulation of the decision button 112d.

According to a second battle system utilizing the characteristic function of the entertainment system 10, the navigation mark moves to circulate along a predetermined graphic object. The next event to be developed is determined based on the time difference between a point of time when the navigation mark reached an arbitrary point on the circulating line and a point of time when the user inputted manipulation data via the manual controller 16.

Figure 15:
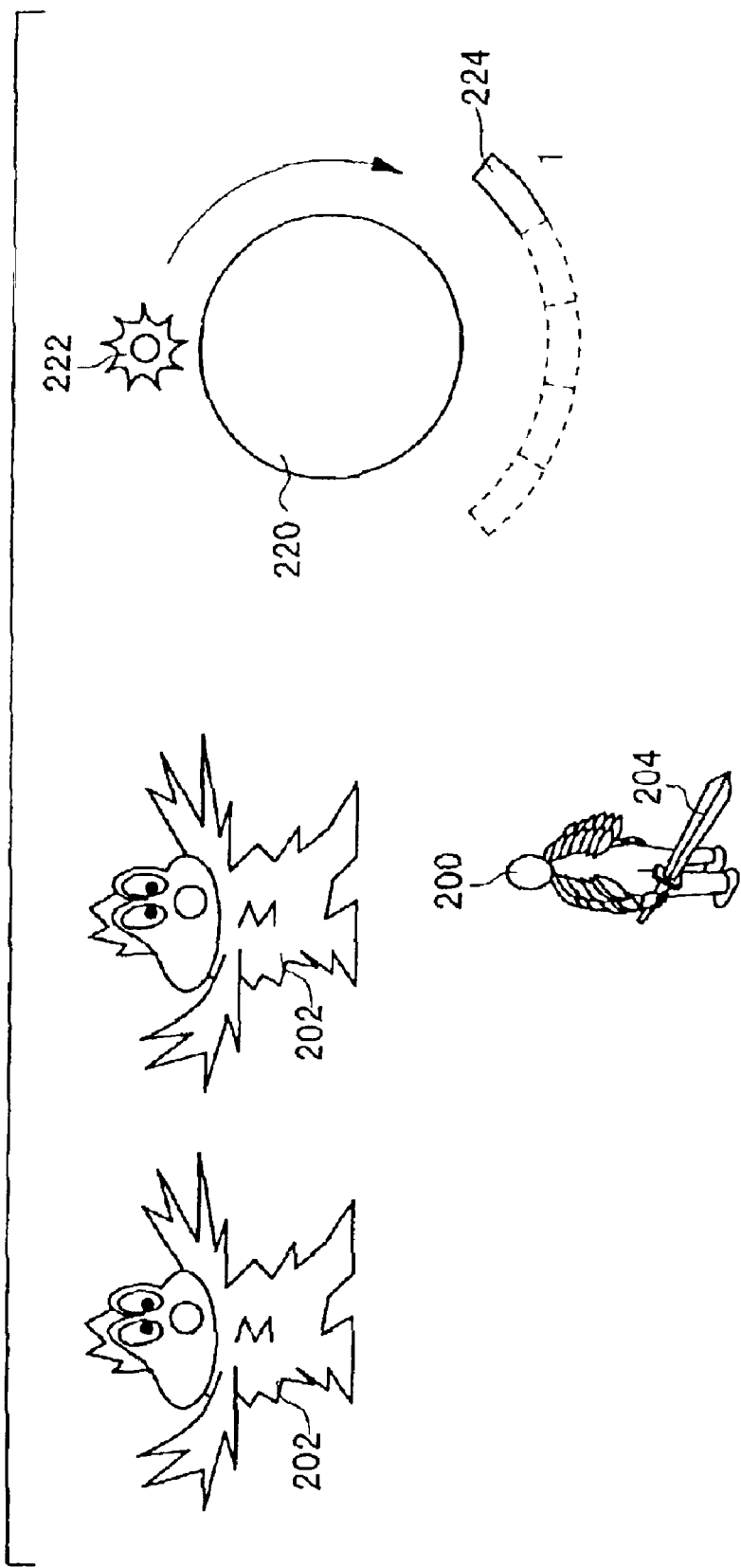
FIG. 15 is a view showing a condition in which a transformed main character and monsters are standing face-to-face.
Figure 16:
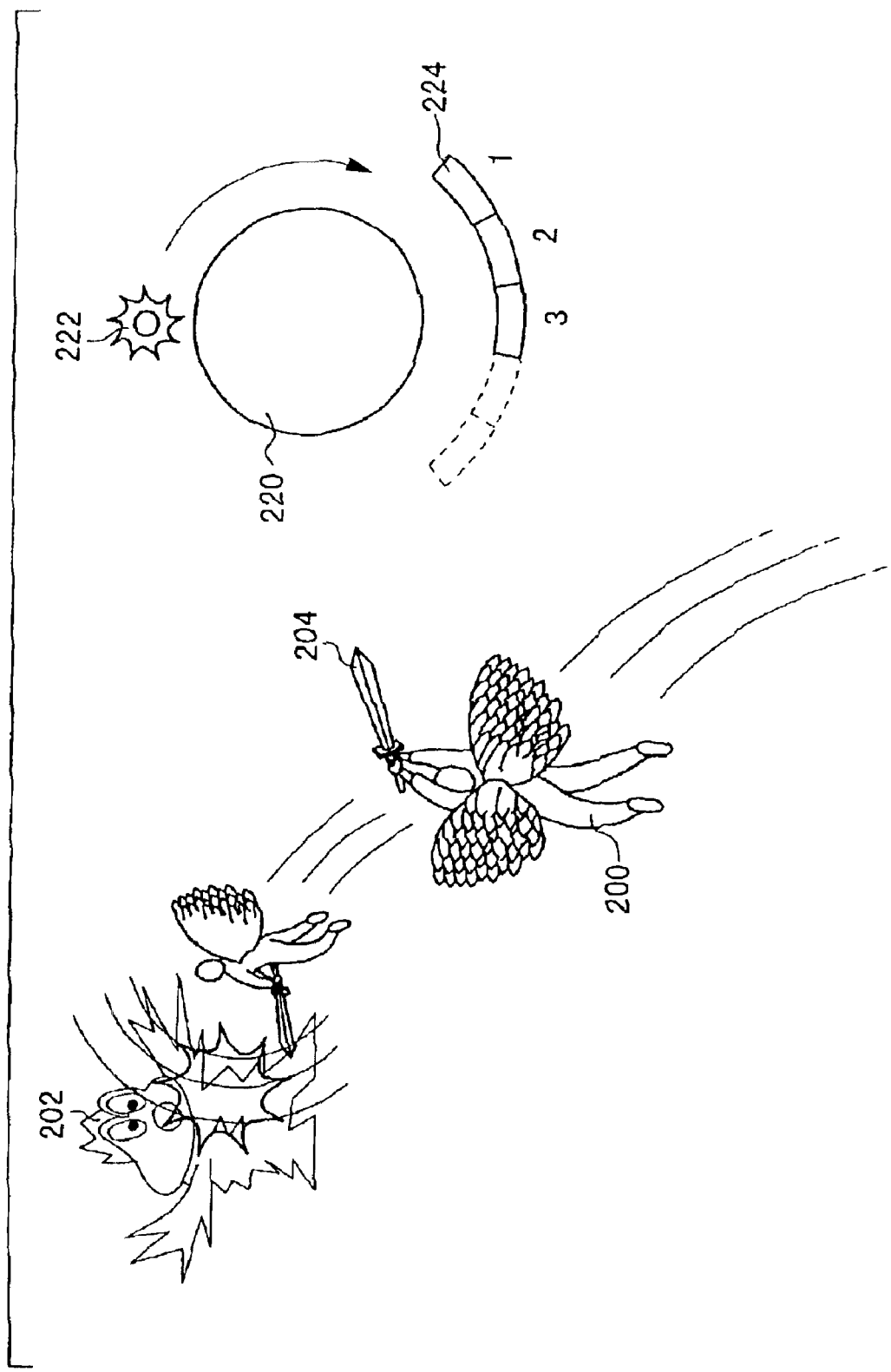
FIG. 16 is a view showing a condition in which the transformed main character is attacking the monster.

The second battle system will be described specifically with reference to FIGS. 15 and 16 schematically showing another battle scene of the role playing game.

As shown in FIG. 15, a transformed main character 200 and monsters 202 are displayed on the display monitor 18. Further, a light-emitting point (navigation mark) 222 is displayed right above a circular timing meter 220 at the 12 o'clock position. When the user pushes the decision button 112d, the navigation mark 222 starts to move clockwise along the circular timing meter 220 for one cycle until it moves back to the initial position at 12 o'clock.

If the user pushes the decision button 112d again at the best timing, right when the navigation mark 222 reaches the 12 o'clock position, the navigation mark 222 accelerates its speed and moves along the circular timing meter 220 again for another cycle. At this time, the number of attacks is incremented by 1. That is, if the user successfully pushes the decision button 112d at the best timing, right when the navigation mark 222 reaches the 12 o'clock position, the navigation mark 222 does not stop at the 12 o'clock position and continues its movement for another cycle. Unless the user misses the timing for pushing the decision button 112d in every cycle, the navigation mark 222 continues to move for a predetermined number of cycles (for example, for five cycles). The number of attacks can be indicated by the number of arc-shaped bars 224 positioned around the timing meter 220.

If the user misses the timing, the navigation mark 222 stops its movement and the number of attacks will not be incremented any more.

When the number of attacks is determined by the timing meter 220, as shown in FIG. 16, the main character 200 successively attacks the monster 202 multiple times corresponding to the determined number of attacks. In FIG. 16, since three bars 224 are indicated, the user can successively attack the monster 202 three times.

Next, an example of software (event determining means 300) for carrying out the characteristic function of the entertainment system 10 will be described with reference to FIGS. 17 through 27. For the purpose of brevity, the software (event determining means 300) will be described basically in connection with a battle between a single main character 200 and a single monster 202. However, it is to be understood that the software (event determining means 300) can also be applied to a battle between a plurality of main characters 200 and a plurality of monsters 202. For example, a main character may attack a plurality of monsters at the same time in one attack turn.

The event determining means 300 can be supplied from a randomly accessible recording medium such as a CD-ROM, a memory card 14 or the like to the entertainment apparatus 12. Alternatively, the event determining means 300 can be downloaded via a network such as the Internet or downloaded via a satellite communication or the like to the entertainment apparatus 12. In the following explanation, the event determining means 300 is supplied from an optical disk (e.g., CD-ROM) 20.

Specifically, the optical disk 20 is played back by the optical controller 88 to read the event determining means 300 and the read event determining means 300 is stored in a main memory in the control system 82 of the entertainment apparatus 12 by a predetermined process. Thereafter, the event determining means 300 is executed by the CPU 80 of the control system 82 of the entertainment apparatus 12.

Figure 17:
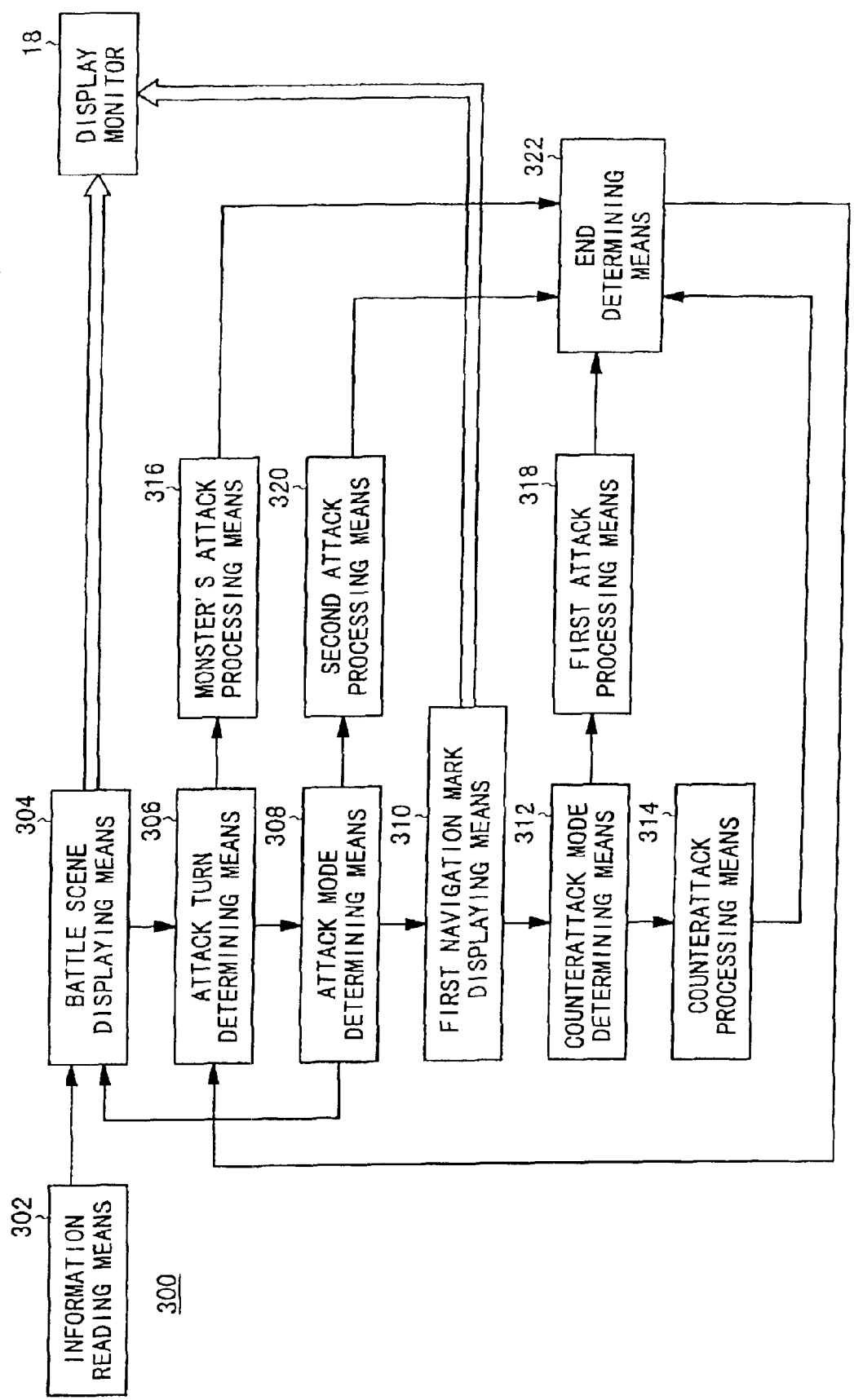
FIG. 17 is a functional block diagram showing a system of event determining means.

As shown in FIG. 17, the event determining means 300 comprises information reading means 302, battle scene displaying means 304, attack turn determining means 306, attack mode determining means 308, first navigation mark displaying means 310, counterattack mode determining means 312, and counterattack processing means 314. The information reading means 302 reads information about the main character 200 and the monster 202 from the optical disk 20. The battle scene displaying means 304 displays images of a background, the main character 200, and the monster 202 as a battle scene on the display monitor 18. The attack turn determining means 306 determines whether the present attack turn is for the main character 200 or for the monster 202. The attack mode determining means 308 determines whether transformation points for changing the attack mode of the main character 200 is the maximum or not. Further, the attack mode determining means 308 determines whether there is an input of a manipulation command for changing the attack mode of the main character 200 or not. The first navigation mark displaying means 310 displays the navigation mark (outer moving square) 206 on the display monitor 18 such that navigation mark 206 rotates and gradually gets smaller. The counterattack mode determining means 312 determines whether the battle will goes into a counterattack mode for the monster 202 to counterattack the main character 200 or not. The counterattack processing means 314 moves the monster 202 to counterattack the main character 200 on the display monitor 18. Further, the counterattack processing means 314 subtracts damage points by the monster's counterattack from hit points of the main character 200.

The event determining means 300 further comprises monster's attack processing means 316, first attack processing means 318, second attack processing means 320, and end determining means 322. The monster's attack processing means 316 moves the monster 202 to attack the main character 200 on the display monitor 18. Further, the monster's attack processing means 316 subtracts damage points by the monster's attack from hit points of the main character 200. The first attack processing means 318 allows the user to input manipulation data when the navigation mark 206 is rotating and getting smaller. Further, the first attack processing means 318 processes multiple attacks or a single attack of the main character 200 based on the manipulation data inputted by the user. Then, the first attack processing means 318 subtracts damage points by the main character's attack from hit points of the monster 202. The second attack processing means 320 allows the user to input manipulation data when the navigation mark (light emitting point) 222 is moving clockwise (or anti-clockwise) along the timing meter 220. Further, the second attack processing means 320 processes successive attacks or a single attack of the main character 200 based on the manipulation data inputted by the user. Then, the second attack processing means 320 subtracts damage points by the main character's attack from hit points of the monster 202. The end determining means 322 determines the end/continuation of the battle.

Figure 18:
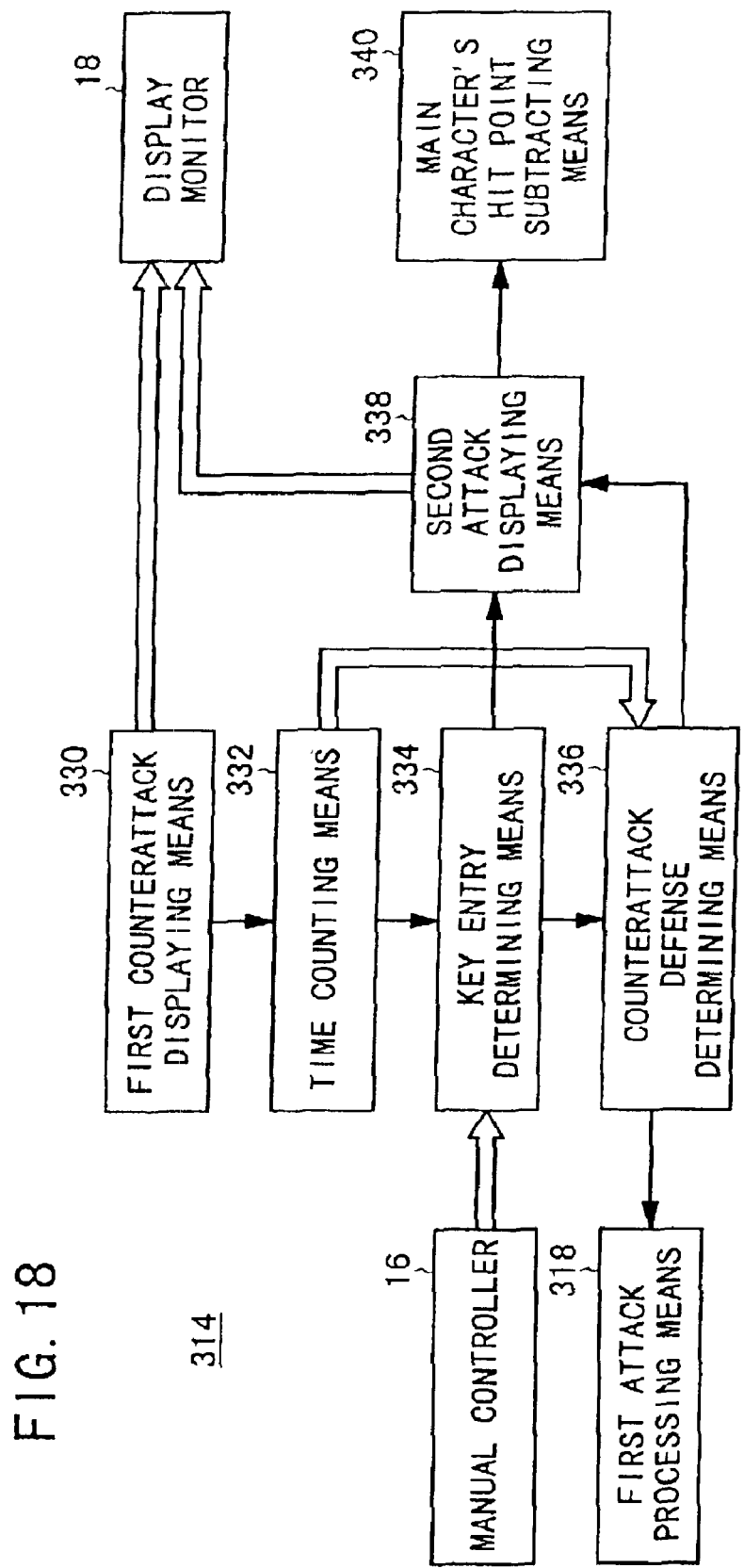
FIG. 18 is a functional block diagram showing a system of counterattack processing means.

As shown in FIG. 18, the counterattack processing means 314 comprises first counterattack displaying means 330, time counting means 332, key entry determining means 334, counterattack defense determining means 336, second counterattack displaying means 338 and main character's hit point subtracting means 340. The first counterattack displaying means 330 displays a battle scene of the counterattack mode for the monster 202 to counterattack the main character 200 on the display monitor 18. The time counting means 332 counts time until the x button 112c is pressed by the user. The key entry determining means 334 determines whether the x button 112c has been pressed by the user or not. The counterattack defense determining means 336 determines whether the monster's counterattack can be defended or not based on the counted time. The second counterattack displaying means 338 moves the main character 200 to be flicked away on the display monitor 18. The main character's hit point subtracting means 340 subtracts damage points by the monster's counterattack from hit points of the main character 200.

Figure 19:
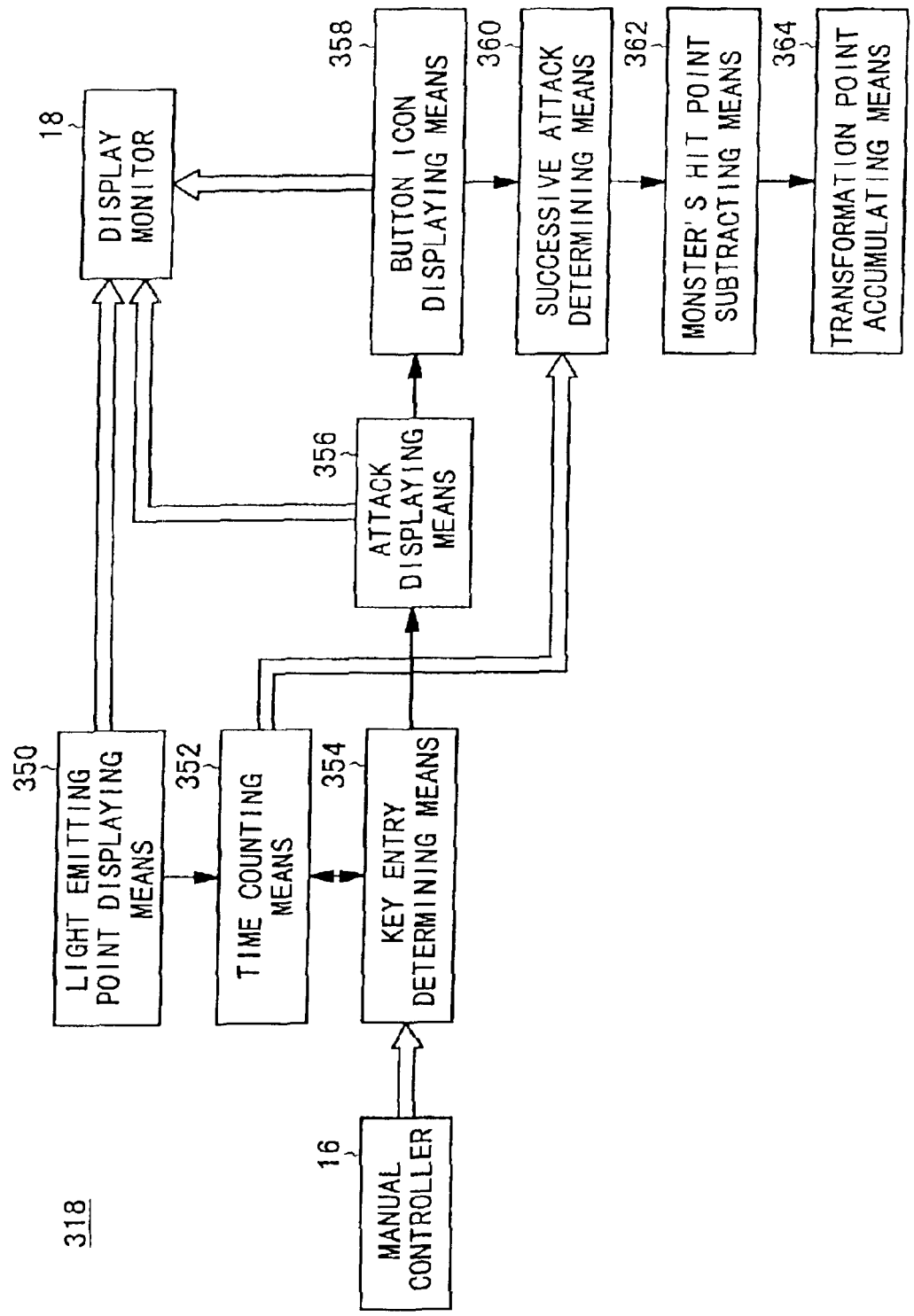
FIG. 19 is a functional block diagram showing a system of first attack processing means.

As shown in FIG. 19, the first attack processing means 318 comprises light emitting point displaying means 350, time counting means 352, key entry determining means 354, attack displaying means 356, button icon displaying means 358, successive attack determining means 360, monster's hit point subtracting means 362, and transformation point accumulating means 364. The light emitting point displaying means 350 processes light emission of the navigation mark 206 on the display monitor 18 when the navigation mark (outer moving square) 206 gets smaller to substantially overlaps the smaller inner stationary square (targeting point) 208, i.e., when the navigation mark 206 stops on the targeting point 208. The time counting means 352 starts counting time when light is emitted from the navigation mark 206. The time counting means 352 counts time until the ○ button (decision button) 112d is pressed by the user. The counted time will be hereinafter referred to as the "input time". The key entry determining means 354 determines whether the decision button 112d has been pressed by the user or not. The attack displaying means 356 moves the main character 200 to attack the monster 202 with the weapon 202 on the display monitor 18. The button icon displaying means 358 displays a button icon 212 on the display monitor 18 such that the button icon 212 is pressed synchronously with the manipulation of the decision button 112d by the user. The successive attack determining means 360 determines whether the main character 200 can successively attack the monster 202 multiple times or not based on the counted time or the maximum number of attacks M. The monster's hit point subtracting means 362 subtracts damage points by the main character's attack from hit points of the monster 202. The transformation point accumulating means 364 accumulates transformation points for changing the attack mode of the main characters 200.

Figure 20:
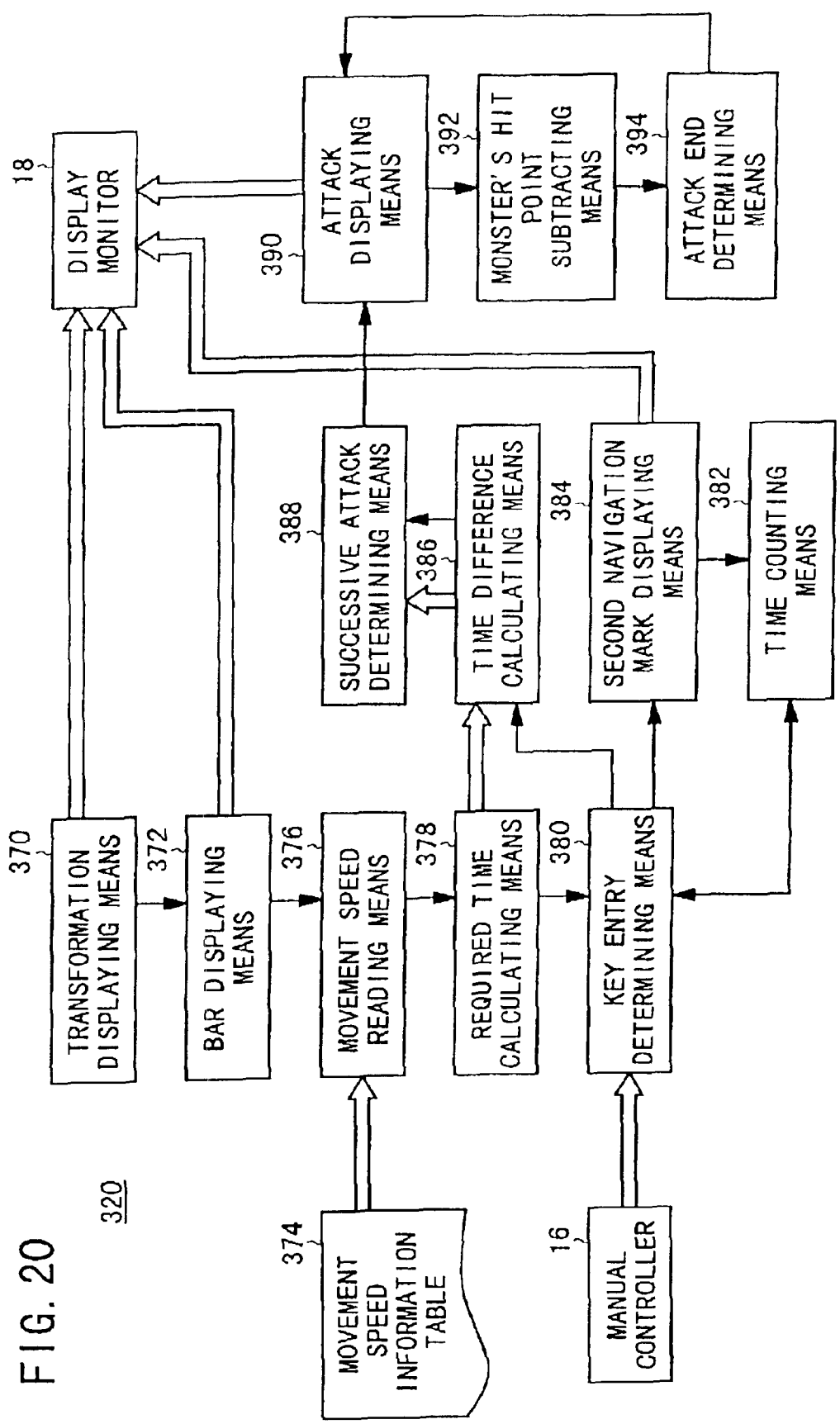
FIG. 20 is a functional block diagram showing a system of second attack processing means.

As shown in FIG. 20, the second attack processing means 320 comprises transformation displaying means 370, bar displaying means 372, movement speed reading means 376, required time calculating means 378, and key entry determining means 380. The transformation displaying means 370 displays a condition in which the main character is being transformed into a more powerful character on the display monitor 18. The bar displaying means 372 displays arc-shaped bars 224 around the timing meter 220 successively on the display monitor 18. The movement speed reading means 376 reads information about the movement speed of the navigation mark 222 from a movement speed information table 374 recorded in the optical disk 20. The required time calculating means 378 calculates the required time for the navigation mark 222 to move around the timing meter 220 for one cycle. The key entry determining means 380 determines whether the decision button 112d has been pressed by the user or not.

The second attack processing means 320 further comprises time counting means 382, second navigation mark displaying means 384, time difference calculating means 386, successive attack determining means 388, attack displaying means 390, monster's hit point subtracting means 392, and attack end determining means 394. The time counting means 382 starts to count time when the navigation mark 222 starts to move around the timing meter 220. The time counting means 382 counts time until the decision button 112d is pressed by the user. The second navigation mark displaying means 384 moves the navigation mark 222 around the timing meter 220 for one cycle. The time difference calculating means 386 calculates the time difference between the required time and the input time (counted time). The successive attack determining means 388 determines whether the main character 200 can successively attack the monster 202 multiple times based on the time difference. The attack displaying means 390 moves the main character 200 to attack the monster with the weapon 204 on the display monitor 18. The monster's hit point subtracting means 392 subtracts damage points by the monster's attack from hit points of the main character 200. The attack end determining means 394 determines whether the determined number of attacks have been already performed or not.

Next, the processing sequence of the event determining means 300 will be described with reference to flow charts of FIGS. 21 through 27.

Figure 21:
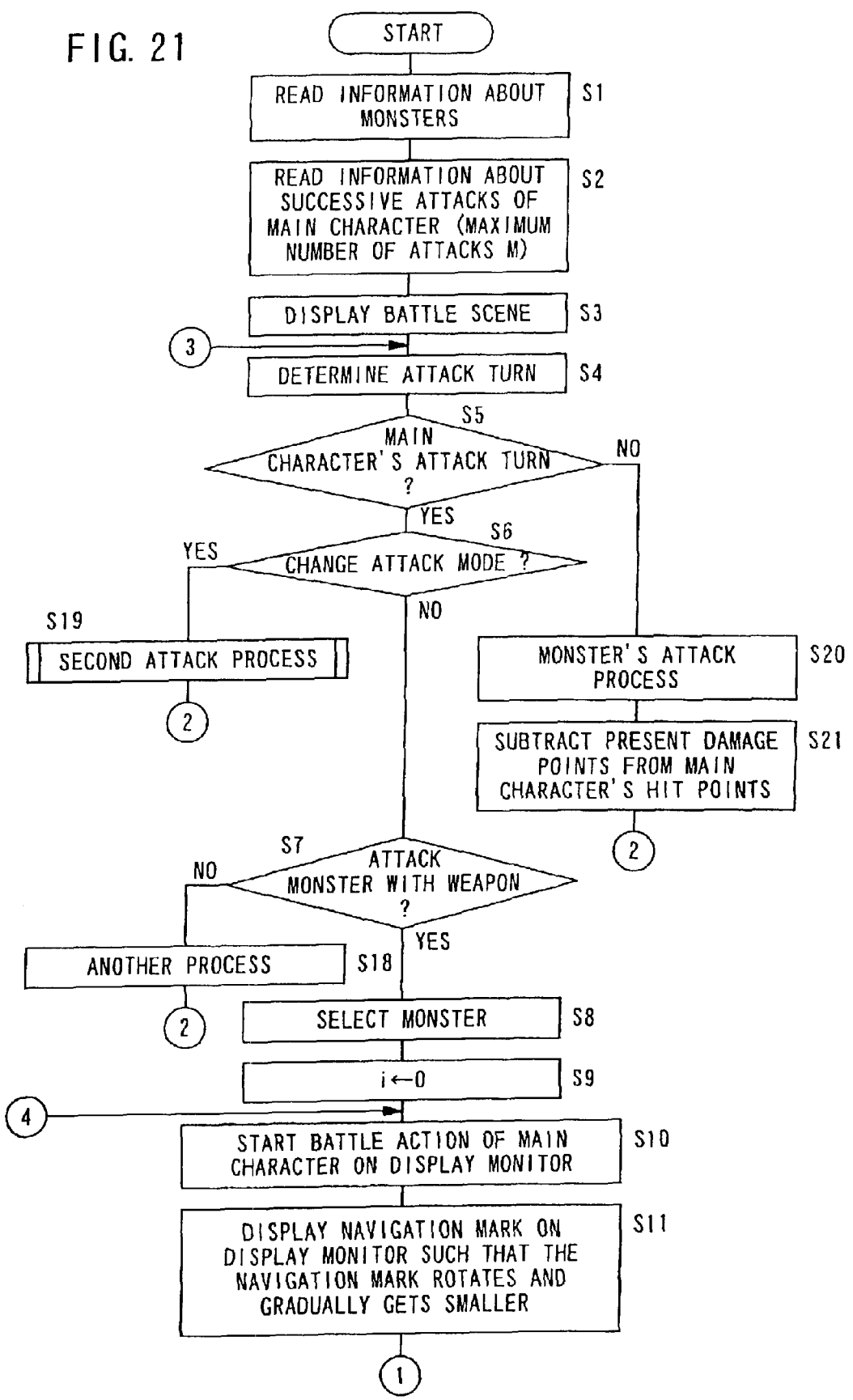
FIG. 21 is a flow chart (No. 1) showing a processing sequence of the event determining means.

Firstly, as shown in Step S1 of FIG. 21, the information reading means 302 reads information about the monster(s) 202 from the optical disk 20. Then, in Step S2, the information reading means 302 reads information about successive attacks (the maximum number of attacks M) of the main character 200 from the optical disk 20.

Next, in Step S3, the battle scene displaying means 304 displays images of a background, the main character 200, and the monster(s) 202 as a battle scene on the display monitor 18. Then, the control goes to Step S4. In Step S4, the attack turn determining means 306 determines the attack turn. The attack turn may be determined based on a random number. Alternatively, the attack turn may be determined by a predetermined order (e.g., first turn: main character→second turn: monster→third turn: main character).

If the attack turn determining means 306 determines that the present attack turn is for the main character 200 in Step S5, the control goes to Step S6. In Step S6, the attack mode determining means 308 determines the present attack mode of the main character 200. For example, there are two attack modes for the main character's attack, i.e., a normal attack mode and a transformation attack mode. The normal attack mode is performed when the main character 200 is in the normal condition. The transformation attack mode is performed when the main character 200 is in the transformed condition. When the main character 200 has gained transformation points to the maximum, the user can selectively transform the main character 200 into a more powerful character by inputting a manipulation command for changing the attack mode from the normal attack mode to the transformation attack mode. That is, if the transformation points is the maximum and there is an input of the manipulation command for changing the attack mode, the attack mode determining means 308 determines that the present attack mode of the main character is the transformation attack mode.

If it is determined that the present attack mode is not the transformation attack mode, i.e., if it is determined that the present attack mode is the normal attack mode, the control goes to Step S7 for determining the action of the main character 200 in the normal attack mode based on a manipulation command inputted by the user. If it is determined that there is a manipulation command for attacking the monster 202 with the weapon 204 is inputted by the user, the control goes to Step S8 for selecting one monster 202. Then, after the monster 202 is selected in Step S8, the control goes to Step S9.

In Step S9, an index register i used for updating information of successive attacks is initialized by storing an initial value 0 in the index register i. Thereafter, in Step S10, as shown in FIG. 10, the battle scene displaying means 304 moves the main character 200 to start running toward the selected monster 202 on the display monitor 18.

Next, in Step S11, as shown in FIG. 11, the first navigation mark displaying means 310 displays the navigation mark 206 on the display monitor 18 such that the navigation mark 206 rotates and gradually gets smaller. Then, the control goes to Step S12 of FIG. 22.

In Step S12, the counterattack mode determining means 312 determines whether the selected monster 202 is the type of a monster which performs a counterattack or not based on the information about the monster 202 read by the information reading means 302 in Step S1.

If it is determined that the monster 202 is not the type of a monster which performs a counterattack, the control goes to Step S13 for performing the process of the first attack processing means 318.

The process of the first attack processing means 318 will be described with reference to the flow chart of FIG. 23.

In Step S101, when the rotating navigation mark 206 gets smaller to substantially overlap the targeting point 208 on the display monitor 18 by the process of the first navigation mark displaying means 310, the light emitting point displaying means 350 of the first attack processing means 328 processes light emission of the navigation mark 206.

In Step S102, the time counting means 352 of the first attack processing means 318 starts to count time when light is emitted from the navigation mark 206. The time counting means 352 counts time until the decision button 112d is pressed by the user. In Step S103, the key entry determining means 354 of the first attack processing means 318 determines whether the decision button 112d has been pressed by the user or not. If it is determined that the decision button 112d has not been pressed by the user in Step S102, the control goes to Step S104. In Step S104, it is determined whether a predetermined time has passed or not.

If it is determined that the predetermined time has passed in Step S104, that is, if it is determined that the decision button 112d has not been pressed for the predetermined time, the process of the first attack process means 318 is brought to an end. If it is determined that the predetermined time has not passed in Step S104, the control goes back to Step S103. If it is determined that the decision button 112d has been pressed in Step S103, that is, if it is determined that the decision button 112d has been pressed within the predetermined time, the control goes to Step S105.

In Step S105, as shown in FIG. 12, the attack displaying means 356 of the first attack processing means 318 moves the main character 200 to attack the monster 202 with the weapon 204 on the display monitor 18. Then, in Step S106, the button icon displaying means 358 of the first attack processing means 318 displays the button icon 212 on the display monitor 18 such that the button icon 212 is pressed synchronously with the manipulation of the decision button 112d. Then, the control goes to Step S107.

In Step S107, the successive attack determining means 360 of the first attack processing means 318 determines whether the main character 200 can successively (additionally) attack the monster 202 or not based on the counted time (input time). Specifically, it is determined that the input time is within a predetermined range or not. If it is determined that the input time is within a predetermined range, that is, if it is determined that the main character 200 can successively (additionally) attack the monster 202, the control goes to Step S108. In Step S108, the monster's hit point subtracting means 362 of the first attack processing means 318 subtracts damage points by the main character's attack from hit points of the monster 202. Thereafter, in Step S109, the transformation point accumulating means 364 of the first attack processing means 318 accumulates transformation points for changing the attack mode of the main character 200.

Then, after updating the value of the index register i to be incremented by 1 in Step S110, the control goes to Step S111. In Step S111, the successive attack determining means 360 of the first attack processing means 318 determines whether the main character 200 can successively (additionally) attack the monster 202 or not based on the maximum number of attacks M. Specifically, if the value of the index register i is less than the maximum number of attacks M, the main character 200 can successively attack the monster 202. For example, the maximum number of attacks M depends on the level of the main character 200.

If it is determined that the main character 200 can successively attack the monster 202, the control goes back to Step S10 for performing the process of the next attack. If it is determined that the main character 200 can not successively attack the monster 202, the process of the attack processing means 318 is brought to an end.

The main routine of the event determining means 300 will be described again from Step S12 of FIG. 22. In Step S12, if it is determined that the monster 202 is not the type of a monster which performs a counterattack, the control goes to Step S14. In Step S14, the counterattack mode determining means 312 determines whether the main character 200 is in the middle of successive attacks based on the value of the index register i. That is, if the value of the index register i is 1 or greater than 1, it is determined that the main character 200 is in the middle of successive attacks.

If it is determined that the main character 200 is not in the middle of successive attacks, i.e., the present attack of the main character 200 is a first attack, the control goes to Step S13 for performing the above mentioned process of the first attack processing means 318. If it is determined that the main character 200 is in the middle of successive attacks, the control goes to Step S15 for generating a random number which is used to determine whether the battle will go into a counterattack mode for the monster 202 to attack the main character 200 or not.

Next, in Step S16, the counterattack mode determining means 312 determines whether the battle will go into the counterattack mode or not. Specifically, it is determined that the random number generated in Step S15 is included in a group of numbers indicating the probability of counterattack or not. The groups of numbers indicating the probability of counterattack will be simply referred to as the probability numbers. The probability numbers are provided from the information about the selected monster 202 read in Step S1.

If it is determined that the random number is included in the probability numbers, the control goes to Step S17 for performing the process of the counterattack processing means 314.

The process of the counterattack processing means 314 will be described specifically with reference to the flow chart of FIG. 24.

Figure 24:
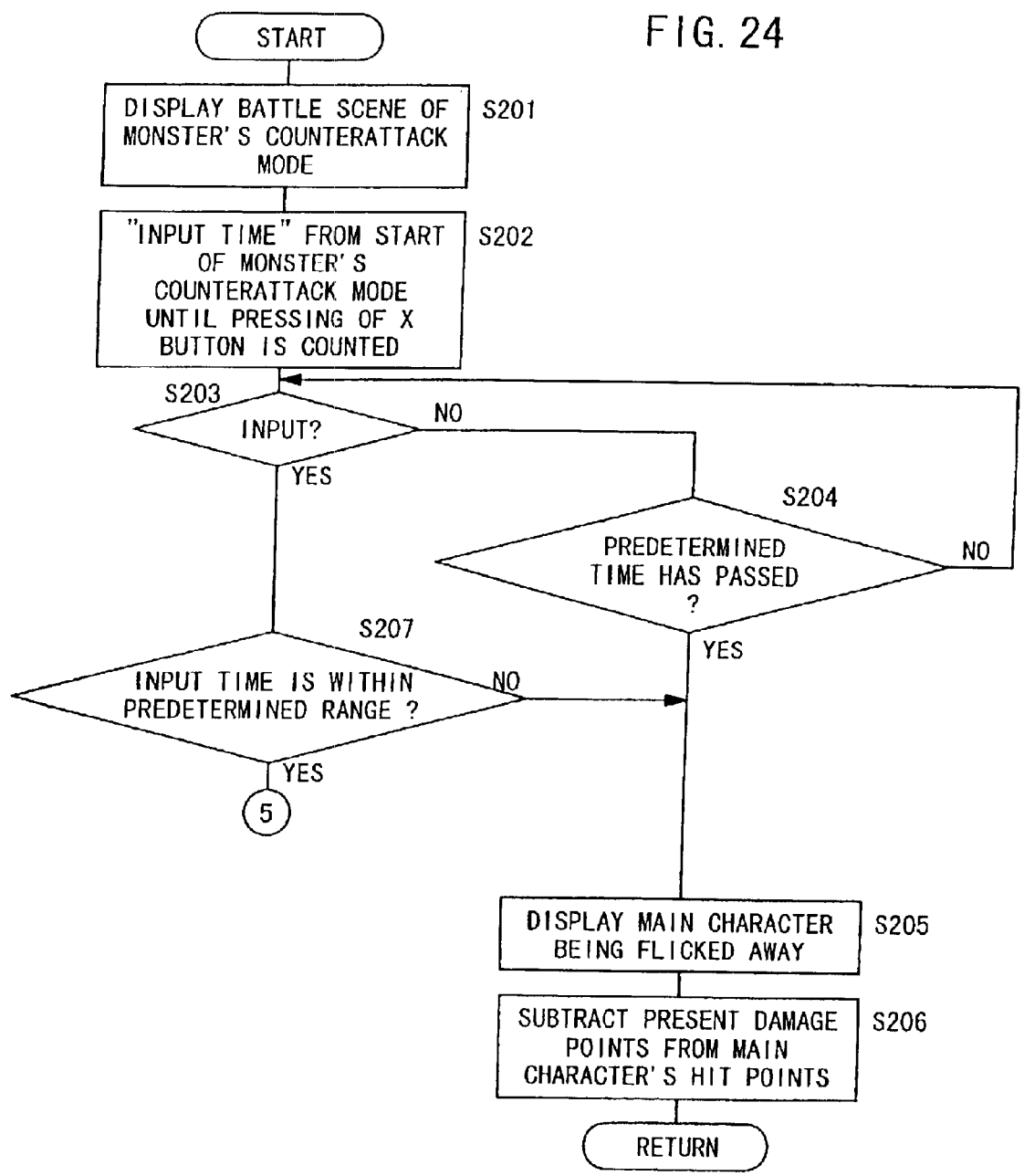
FIG. 24 is a flow chart showing a processing sequence of the counterattack processing means.

In Step S201 of FIG. 24, as shown in FIG. 13, the first counterattack displaying means 330 of the counterattack processing means 314 displays a battle scene of the counterattack mode for the monster 202 to counterattack the main character 200 on the display monitor 18. Then, the control goes to Step S202.

In Step S202, the time counting means 332 of the counterattack processing means 314 counts time when the counterattack mode of the monster 202 is displayed on the display monitor 18. The time counting means 332 counts time until the x button 112c is pressed by the user. Thereafter, in Step S203, the key entry determining means 334 of the counterattack processing means 314 determines whether the x button 112c has been pressed by the user or not.

If it is determined that the x button 112c has not pressed by the user in Step S203, the control goes to Step S204. In Step S204, it is determined whether a predetermined time has been passed or not.

If it is determined that the predetermined time has passed in Step S204, that is, if it is determined that the x button 112c has not been pressed for the predetermined time, the control goes to Step S205. In Step S205, the second counterattack displaying means 338 of the counterattack processing means 314 moves the main character 200 to be flicked away by the counter barrier 210 on the display monitor 18 as shown in FIG. 14, for example. Thereafter, in Step S206, the main character's hit point subtracting means 340 of the counterattack processing means 314 subtracts damage points by the monster's counterattack from hit points of the main character 200. Then, the process of the counterattack processing means 314 is brought to an end.

If it is determined that the predetermined time has not passed in Step S204, the control goes back to Step S203. If it is determined that the x button 112c has been pressed in Step S203, that is, if it is determined that the x button 112c has been pressed within the predetermined time, the control goes to Step S207. In Step S207, the counter attack defense determining means 336 of the counter attack processing means 314 determines whether the monster's counterattack can be defended based on the counted time (input time). Specifically, it is determined whether the input time is within a predetermined range or not. If it is determined that the input time is not within the predetermined range, that is, if it is determined that the monster's counterattack can not be defended, the control goes to Steps S205 and S206 for performing the process of the second counterattack displaying means 338 and the process of the main character's hit point subtracting means 340. That is, the main character 200 is flicked away by the counter barrier 210 and damage points by the monster's counterattack is subtracted from hit points of the main character 200. Then, the process of the counterattack processing means 314 is brought to an end.

Figure 23:
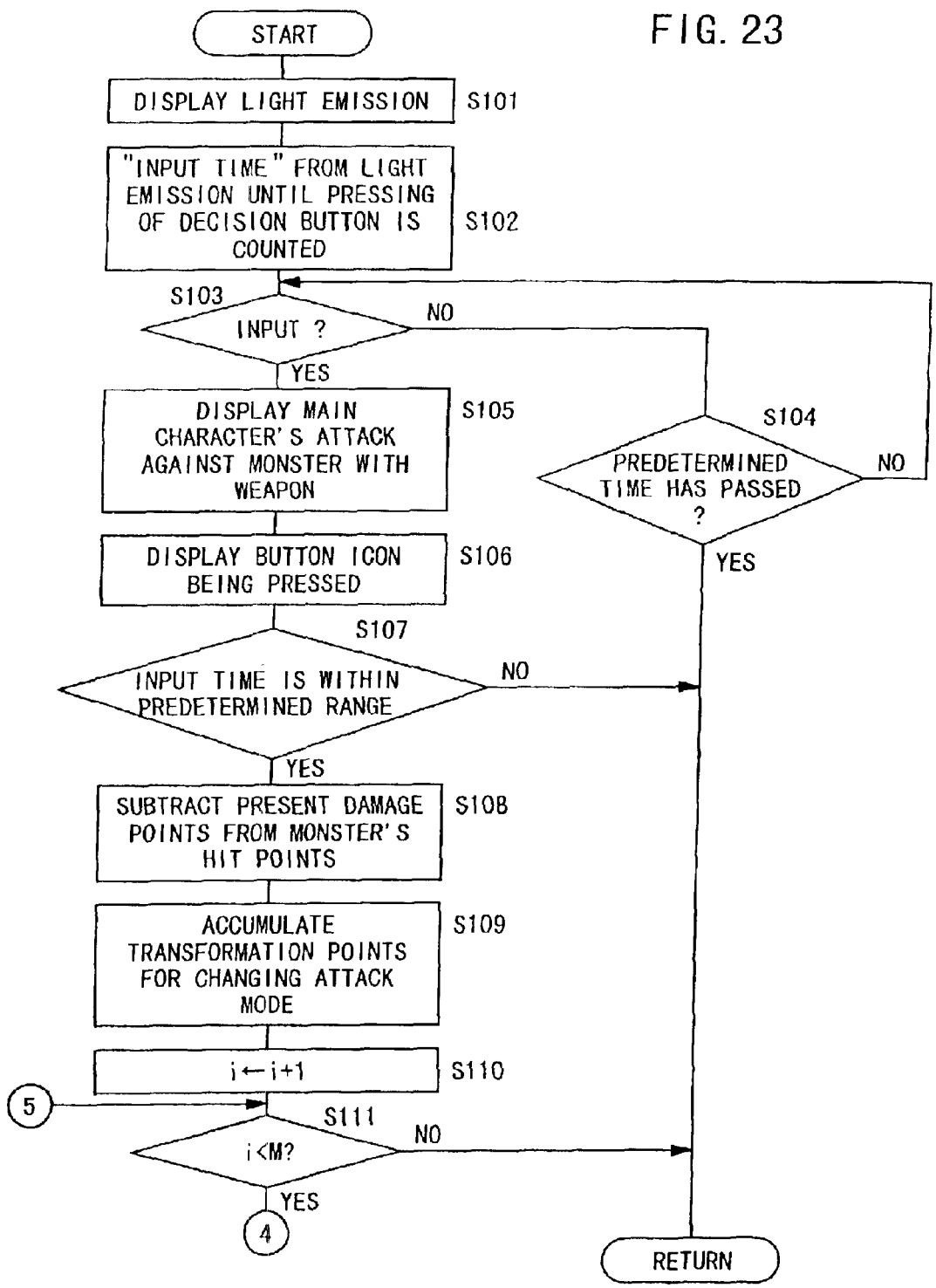
FIG. 23 is a flow chart showing a processing sequence of the first attack processing means.

If it is determined that the input time is within the predetermined range, that is, if it is determined that the monster's counterattack can be defended, the control goes to Step S111 of FIG. 23 for performing the process of the first attack processing means 318. Specifically, as described above, the successive attack determining means 360 of the first attack processing means 318 determines whether the main character 200 can successively (additionally) attack the monster 202 or not based on the maximum number of attacks M.

The main routine of the event determining means 300 in FIG. 21 will be described again.

In Step S7, if it is determined that the manipulation command inputted by the user is not a command for attacking the monster 202 with the weapon 204, that is, if it is determined that the manipulation command inputted by the user is a command for casting a magic spell or a command for using an item, for example, the control goes to Step S18 for performing another process depending on the type of the command.

In Step S6, if it is determined that the present attack mode is the transformation attack mode, the control goes to Step S19 for performing the process of the second attack processing means 320.

The process of the second attack processing means 320 will be described with reference to the flow charts of FIGS. 25 and 26.

Figure 25:
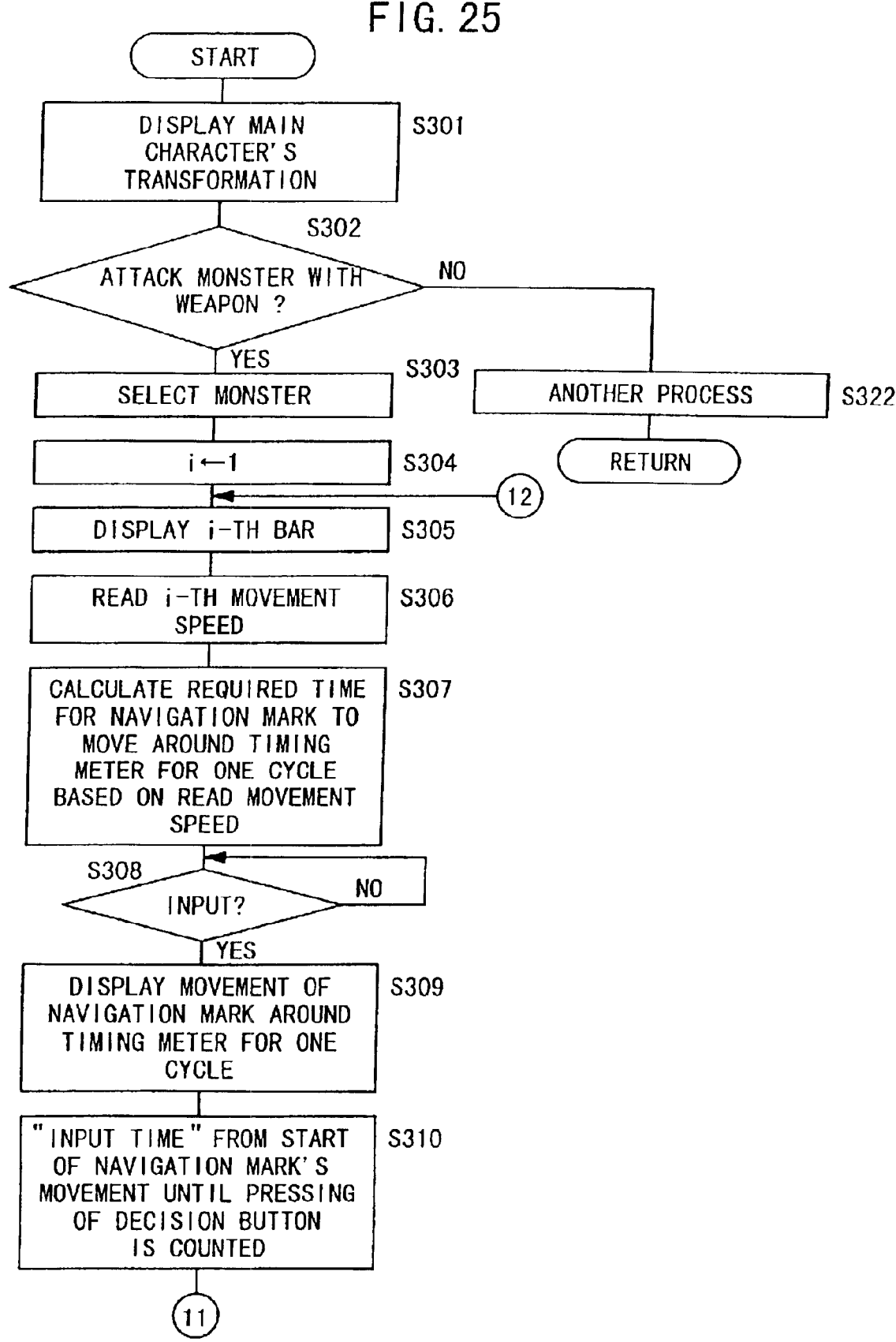
FIG. 25 is a flow chart (No. 1) showing a processing sequence of the second attack processing means.

In Step S301 of FIG. 25, the transformation displaying means 370 of the second attack processing means 320 displays a condition in which the main character 200 is being transformed into a more powerful character. The transformed main character is shown in FIG. 15. Then, the control goes to Step S302.

In Step S302, the action of the main character 200 in the transformation attack mode is determined based on a manipulation command inputted by the user. If it is determined that the manipulation command is a command for attacking the monster 202 with the weapon 204, the control goes to Step S303 for selecting the monster 202 to be targeted for attack. Then, after the monster 202 is selected in Step S303, the control goes to Step S304.

In Step S304, a value 1 is stored in the index register i for updating the number of attacks. Then, the control goes to Step S305.

In Step S305, the bar displaying means 372 of the second attack processing means 320 displays the i-th arc-shaped bar 224 around the timing meter 220.

Next, in Step S306, the movement speed reading means 376 of the second attack processing means 320 reads information about the movement speed of the navigation mark 222 from the i-th record of a movement speed information table shown in FIG. 27. Then in Step S307, the required time calculating means 378 of the second attack processing means 320 calculates the required time for the navigation mark 222 to move around the timing meter 220 for one cycle based on the movement speed read in Step S306.

Next, in Step 308, the key entry determining means 380 of the second attack processing means 320 determines whether the decision button 112d has been pressed by the user or not. When it is determined that the decision button 112d has been pressed, the control goes to Step S309.

In Step S309, the second navigation mark displaying means 384 of the second attack processing means 320 moves the navigation mark 222 around the timing meter 220 for one cycle at the movement speed read in Step S306.

Then, in Step S310, the time counting means 382 of the second attack processing means 320 counts time until the decision button 112d is pressed by the user.

Figure 26:
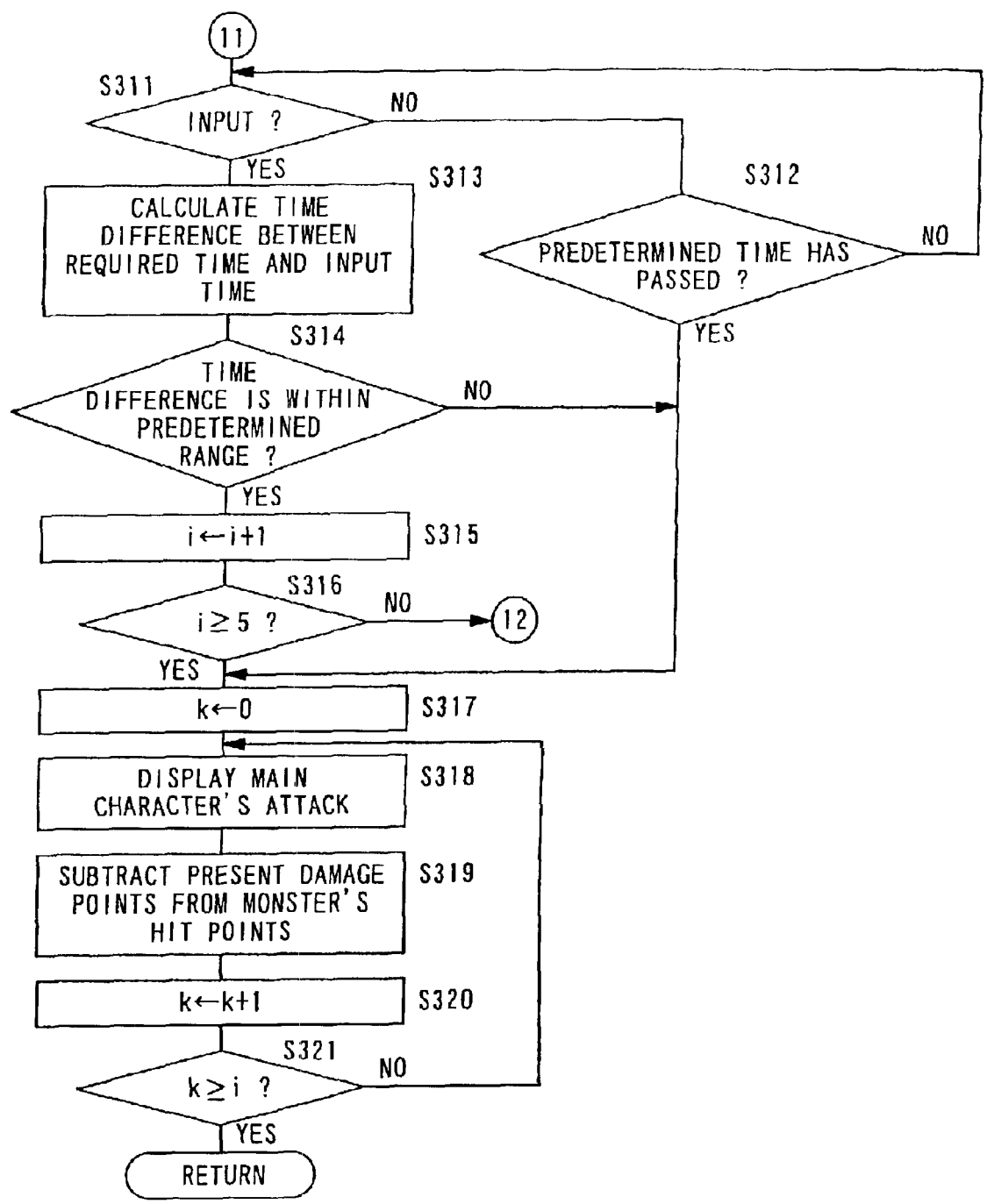
FIG. 26 is a flow chart (No. 2) showing a processing sequence of the second attack processing means.

Thereafter, in Step S311 of FIG. 26, the key entry determining means 380 of the second attack processing means 320 determines whether the decision button 112d has been pressed by the user or not. If it is determined that the decision button 112d has not been pressed, the control goes to Step S312. In Step 312, it is determined whether a predetermined time has passed or not.

If it is determined that the predetermined time has passed in Step S312, that is, if it is determined that the decision button 112d has not been pressed for the predetermined time, the control goes to Step S317. The processing sequence of Step S317 and the subsequent steps will be described later on.

If it is determined that the predetermined time has not passed in Step S312, the control goes back to Step S311. If it is determined that the decision button 112d has been pressed in Step S311, that is, if it is determined that the decision button has been pressed within the predetermined time, the control goes to Step S313.

In Step S313, the time difference calculating means 386 calculates the difference between the required time and the counted time (input time).

Then, in Step S314, the successive attack determining means 388 of the second attack processing means 320 determines whether the main character 200 can successively (additionally) attack the monster 202 or not based on the time difference. Specifically, it is determined whether the input time is within a predetermined range or not.

If it is determined that the input time is not in the predetermined range, the main character can not additionally attack the monster 202. In this case, the control goes to Step S317.

If it is determined that the input time is within the predetermined range, the main character 200 can additionally attack the monster 202. In this case, the control goes to Step S315 for updating the value of the index register i to be incremented by 1. Then, the control goes to Step S316. In Step S316, it is determined whether the value of the index register i is a predetermined maximum number of attacks or greater than the predetermined maximum number of attacks (for example, i≧5) or not.

If it is determined that the value of the index register i is less than the predetermined maximum number of attacks, the control goes back to Step S305. The processing sequence of Step S305 and the subsequent steps has already been described above.

If it is determined that the value of the index register i is the predetermined maximum number of attacks or greater than the predetermined maximum number of attacks, the control goes to Step S317.

In Step S317, an index register k used for counting the number of actual attacks is initialized by storing an initial value 0 in the index register k.

Next, in Step S318, the attack displaying means 390 of the second attack processing means 320 moves the main character 200 to fly over the monster 202 to attack the monster 202 with the weapon 202 on the display monitor 18 as shown in FIG. 16, for example. Then, in Step S319, the monster's hit point subtracting means 392 of the second attack processing means 320 subtracts damage points by the main character's attack from hit points of the monster 202.

Then, after updating the value of the index register k to be incremented by 1 in Step S320, the control goes to Step S321. In Step 321, the attack end determining means 394 of the second attack processing means 320 determines whether the determined number (i) of attacks have already been performed or not. Specifically, it is determined that the value of the index register k is same as or greater than the value of the index register i or not. If the vale of the index register k is same as or greater than the value of the index register i, it is determined that the determined number (i) of attacks have already been performed.

If it is determined that the determined number (i) of attacks have not been performed yet, the control goes back to Step 318 and the subsequent steps for performing the process of the next attack against the monster 202. If it is determined that the determined number (i) of attacks have already been performed, the process of the second attack processing means 320 is brought to an end.

In Step S302 of FIG. 25, if it is determined that the manipulation command is not a command for attacking the monster 202 with the weapon 204, that is, if it is determined that the manipulation command is a command for casting a spell or a command for using an item, the control goes to Step S322 for performing another process based on the manipulation command.

The main routine of the event determining means 300 in FIG. 21 will be described again from Step S5.

In Step S5, if it is determined that the present attack turn is for the monster 202, the control goes to Step S20. In Step S20, the monster's attack processing means 316 of the event determining means 300 moves the monster 202 to attack the main character 200 on the display monitor 18. Then, in Step S21, damage points by the monster's attack is subtracted from hit points of the main character 200.

Figure 22:
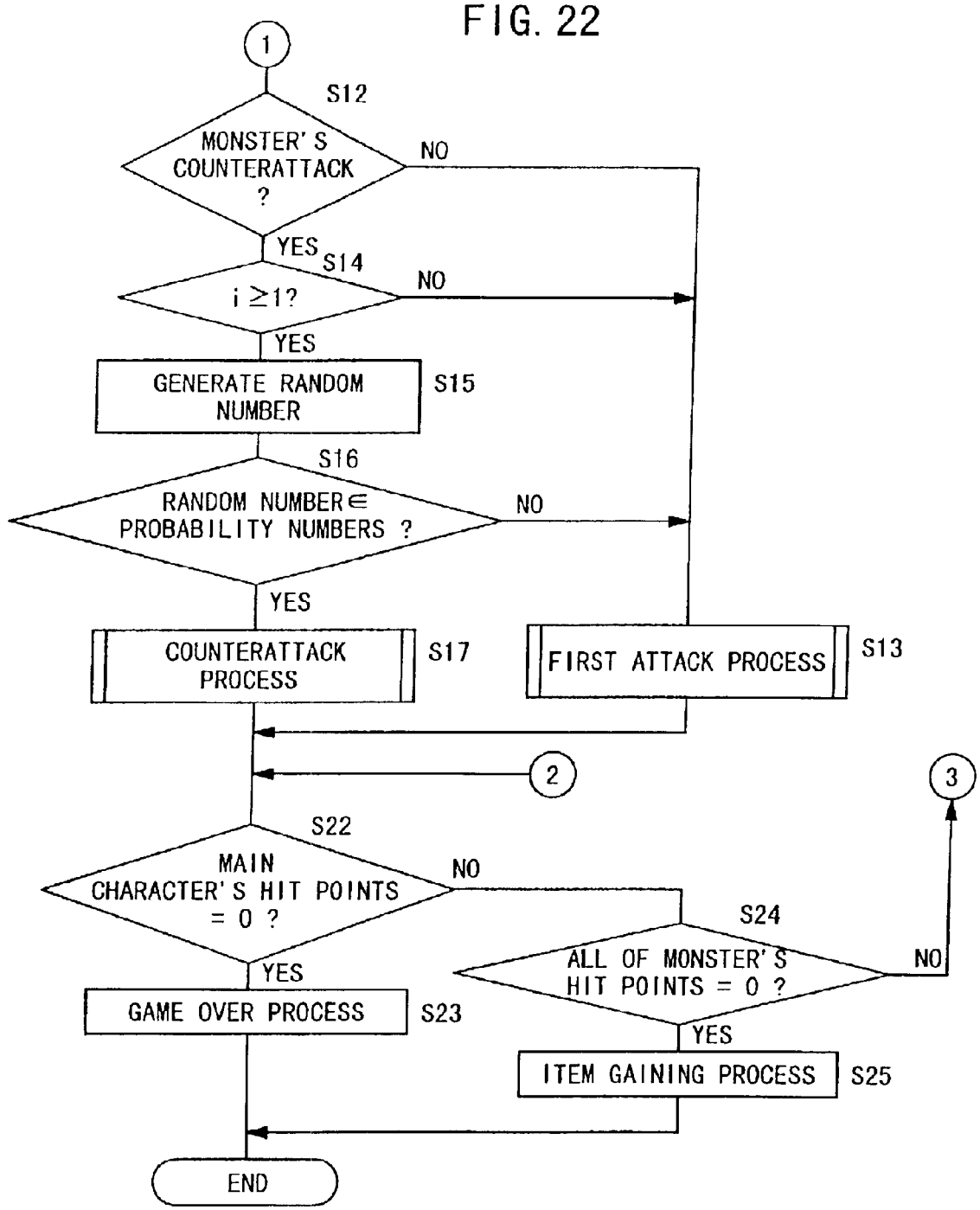
FIG. 22 is a flow chart (No. 2) showing a processing sequence of the event determining means.

When the process of the first attack processing means 318 in Step S13 or the process of the counterattack processing means 314 in Step S17 of FIG. 22 is finished, or when any of the process in Step S18, the process of the second attack processing means 320 in Step S19, and the process in Step S21 is finished, the control goes to Step S22 of FIG. 22.

In Step S22, the end determining means 322 of the event determining means 300 determines whether the value of the main character's hit points 200 is "0" or not.

If it is determined that the value of the main character's hit points is "0", the control goes to Step S23 for performing the process of "Game Over". Then, the process of the event determining means 300 is brought to an end.

If it is determined that the value of the main character's hit points is not "0", the control goes to Step S24 for determining whether the value of the monster's hit points is "0" or not for each of the monsters 202. If it is determined that the value of the monster's hit points is not 0 for any of the monsters 202, the control goes back to Step S4 and the subsequent steps for performing the next attack turn for the main character 200 or the monsters 202. If it is determined that the value of monster's hit points is "0" for all of the monsters 202, the control goes to Step S25. In Step S25, the process of gaining items, gold and experiences by the main character 200 is performed. Then, process of the event performing means 300 is brought to an end.

As described above, according the embodiment of the present invention, the entertainment system 10 comprises the event determining means 300 which moves the navigation mark 202 or 222 as time advances, and which determines the next event to be developed based on the time difference between a point of time when the navigation mark reached a predetermined position and a point of time when the user inputted manipulation data via the manual controller 16.

For example, in a conventional battle scene of a role playing game, when a user tries to attack a monster 202 with a weapon 204, after a command for attacking the monster 202 with the weapon 204 is selected by the user, an animation of the main character 200 for preparing an attack against the monster 202 with the weapon 204 is displayed on a display monitor 18. Then, after manipulation data is inputted by the user, an animation of actually attacking the monster 202 with the weapon 204 is displayed based on the manipulation data.

However, it is not possible to create a sufficiently realistic battle scene merely by the above change of the screen image.

Therefore, according to the embodiment of the present invention, the next event is determined based on the time difference between a point of time when the navigation mark 206 or 222 reached a predetermined position and a point of time when a user inputted manipulation data via the manual controller 16.

Accordingly, it is possible to determine the type of the main character's attack based on the time difference. Specifically, if the time difference is very small, an attack of a higher level (successive attacks) is displayed. If the time difference is large, an attack of a lower level (single attack) or a miss attack is displayed.

Further, it is possible to display additional attacks based on the number of successive comparison results obtained when the time difference is within a predetermined range.

Basically, a battle scene of a role playing game tends to be monotonous. However, according to the embodiment of the present invention, it is possible to make the battle scene of the role playing game highly realistic. Therefore, it is possible to prevent the user from losing interest in the battle scene of the role playing game.

Specifically, according to the present embodiment, when the rotating navigation mark 206 is converged into the targeting point 208, that is, when the navigation mark 206 reaches a predetermined position, light is emitted from the navigation mark. Therefore, it is made easier for the user to recognize the right timing of the navigation mark 206 to reach the predetermined position. In this case, in the battle scene where the navigation mark is rotating and getting smaller, the user can perform an attack of a higher level relatively easily. Accordingly, a further amusing aspect is added to the battle scene.

Further, when the main character 200 is in the middle of successive attacks, since the event determining means 300 comprises the counterattack processing means 314 for processing a counterattack of the monster 202 against the main character 200, a highly realistic battle scene can be provided for the user. Accordingly, the user may feel as if the user were fighting against the monster 202.

The entertainment system, the entertainment apparatus, and the recording medium, and the program shall not be limited to the particular embodiment disclosed herein. It will be apparent to a person skilled in the art that numerous modifications and variation may be made without departing from the spirit and scope of the invention.

What is claimed is:

1. An entertainment system comprising:
    an entertainment apparatus for executing various programs;
    at least one manual controller for inputting a manual control request of a user to said entertainment apparatus; and
    a display monitor for displaying an image outputted from said entertainment apparatus,
    said entertainment apparatus comprising:
    means for performing a first process of moving a navigation mark displayed on said display monitor in a predetermined direction as time advances;
    means for performing a second process of calculating a time difference between a point of time when said navigation mark reached a predetermined position and a point of time when said user inputted manipulation data via said manual controller; and
    means for generating an event and successively repeating said first process and said second process if the time difference is within a predetermined time,
    wherein said event is generated for changing a parameter of a single character.

2. An entertainment system according to claim 1, wherein a next event is determined based on a number of times said first process and said second process are repeated.

3. An entertainment apparatus for executing various programs, said entertainment apparatus being connectable to at least one manual controller for inputting a manual control request of a user to said entertainment apparatus, and connectable to a display monitor for displaying an image outputted from said entertainment apparatus,
    said entertainment apparatus comprising:
    means for performing a first process of moving a navigation mark displayed on said display monitor in a predetermined direction as time advances;
    means for performing a second process of calculating a time difference between a point of time when said navigation mark reached a predetermined position and a point of time when said user inputted manipulation data via said manual controller; and means for generating an event and successively repeating said first process and said second process if the time difference is within a predetermined time, wherein said event is generated for changing a parameter of a single character.

4. An entertainment apparatus according to claim 3, wherein a next event is determined based on a number of times said first process and said second process are repeated.

5. A computer readable medium storing a program and data for use in an entertainment system comprising:

an entertainment apparatus for executing various programs;

at least one manual controller for inputting a manual control request of a user to said entertainment apparatus;

a display monitor for displaying an image outputted from said entertainment apparatus, said recording medium comprising:

means for performing a first process of moving a navigation mark displayed on said display monitor in a predetermined direction as time advances;

means for performing a second process of calculating a time difference between a point of time when said navigation mark reached a predetermined position and a point of time when said user inputted manipulation data via said manual controller; and means for successively repeating said first process and said second process if the time difference is within a predetermined time, wherein after said first process and said second process are repeated, an event is repeatedly generated for changing a parameter of a single character, and said event is repeated as many times an a number of times said first process and second process are repeated.

6. A computer readable medium according to claim 5, wherein said event is determined based on the number of times said first process and said second process are repeated.

7. A method of data processing in an entertainment system comprising;

an entertainment apparatus for executing various programs, at least one manual controller for inputting a manual control request of a user to said entertainment apparatus;

a display monitor for displaying an image outputted from said entertainment apparatus, said method comprising the steps of:

performing a first process of moving a navigation mark displayed on said display monitor in a predetermined direction as time advances;

performing a second process of calculating a time difference between a point of time when said navigation mark reached a predetermined position and a point of time when said user inputted manipulation data via said manual controller; and successively repeating said first process and said second process if the time difference is within a predetermined time, wherein after said first process and said second process are repeated, an event is repeatedly generated for changing a parameter of a single character, and said event is repeated as many times as a number of times said first process and second process are repeated.

8. A method according to claim 7, wherein said event is determined based on the number of times said first process and said second process are repeated.

* * * * *